Nov. 15, 1966 R. W. BLACK ETAL 3,285,435

PORTABLE SHIP'S WING FOR CARGO TRANSFER BY HELICOPTER

Filed Nov. 19, 1964 21 Sheets-Sheet 1

INVENTORS
ROBERT E. BENDL
BY RICHARD W. BLACK

Edward J. Kelly, Harry M. Saragovitz, Herbert Berl & James D. Colvin,
ATTORNEYS

PORTABLE SHIP'S WING FOR CARGO TRANSFER BY HELICOPTER

Filed Nov. 19, 1964 21 Sheets-Sheet 2

INVENTORS

ROBERT E. BENDL

RICHARD W. BLACK

BY Harry M. Saragovitz, Edward J. Kelly, Herbert Berl & James W. Colvin

ATTORNEYS

PORTABLE SHIP'S WING FOR CARGO TRANSFER BY HELICOPTER

INVENTORS
ROBERT E. BENDL
RICHARD W. BLACK
BY Harry M. Saragovitz, Edward J. Kelly, Herbert Berl
& James W. Colvin
ATTORNEYS Nov. 15, 1966 R. W. BLACK ETAL 3,285,435

PORTABLE SHIP'S WING FOR CARGO TRANSFER BY HELICOPTER

Filed Nov. 19, 1964 21 Sheets-Sheet 4

INVENTORS
ROBERT E. BENDL
BY RICHARD W. BLACK
Harry M. Saragovitz, Edward J. Kelly, Herbert Berl & James W. Colvin
ATTORNEYS INVENTORS
BY ROBERT E. BENDL
RICHARD W. BLACK
Harry M. Saragovitz
Edward J. Kelly, Herbert Berl
& James W. Colvin
ATTORNEYS INVENTORS
ROBERT E. BENDL
RICHARD W. BLACK
BY Harry M. Saragovitz
Edward J. Kelly, Herbert Berl
& James W. Colvin
ATTORNEYS

PORTABLE SHIP'S WING FOR CARGO TRANSFER BY HELICOPTER

INVENTORS
BY ROBERT E. BENDL
RICHARD W. BLACK
Harry M. Saragovitz, Edward J. Kelly, Herbert Berl & James W. Colvin ATTORNEYS

PORTABLE SHIP'S WING FOR CARGO TRANSFER BY HELICOPTER

INVENTORS
ROBERT E. BENDL
RICHARD W. BLACK
BY Harry M. Saragovitz, Edward J. Kelly, Herbert Berl & James W. Colton
ATTORNEYS

PORTABLE SHIP'S WING FOR CARGO TRANSFER BY HELICOPTER

Filed Nov. 19, 1964

INVENTORS
ROBERT E. BENDL
RICHARD W. BLACK
BY Harry M. Saragovitz
Edward J. Kelly, Herbert Berl
& James W. Colvin
ATTORNEYS INVENTORS
ROBERT E. BENDL
RICHARD W. BLACK
BY Harry M. Saragovitz, Edward J. Kelly, Herbert Berl & James W. Colvin
ATTORNEYS

PORTABLE SHIP'S WING FOR CARGO TRANSFER BY HELICOPTER

Filed Nov. 19, 1964 21 Sheets-Sheet 11

INVENTORS
ROBERT E. BENDL
RICHARD W. BLACK
BY Harry M. Saragovitz, Edward J. Kelly, Herbert Berl & James W. Colvin
ATTORNEYS

PORTABLE SHIP'S WING FOR CARGO TRANSFER BY HELICOPTER

Filed Nov. 19, 1964 21 Sheets-Sheet 12

INVENTORS
ROBERT E. BENDL
RICHARD W. BLACK
BY Harry M. Saragovitz, Edward J. Kelly, Herbert Berl & James W. Colon
ATTORNEYS INVENTORS
ROBERT E. BENDL
RICHARD W. BLACK
BY Harry M. Saragovitz, Edward J. Kelly, Herbert Berl & James W. Colvin
ATTORNEYS

PORTABLE SHIP'S WING FOR CARGO TRANSFER BY HELICOPTER

INVENTORS
ROBERT E. BENDL
RICHARD W. BLACK
BY Harry M. Saragovitz, Edward J. Kelly, Herbert Berl, & James W. Colvin
ATTORNEYS INVENTORS
ROBERT E. BENDL
RICHARD W. BLACK
BY Harry M. Saragovitz, Edward J. Kelly, Herbert Berl & James W. Colvin
ATTORNEYS INVENTORS
ROBERT E. BENDL
RICHARD W. BLACK
BY Harry M. Saragovitz, Edward J. Kelly, Herbert Berl & James W. Cohen
ATTORNEYS

PORTABLE SHIP'S WING FOR CARGO TRANSFER BY HELICOPTER

Filed Nov. 19, 1964 21 Sheets-Sheet 17

INVENTORS
ROBERT E. BENDL
RICHARD W. BLACK
BY Harry M. Saragovitz, Edward J. Kelly, Herbert Berl & James W. Colvin ATTORNEYS

PORTABLE SHIP'S WING FOR CARGO TRANSFER BY HELICOPTER

Filed Nov. 19, 1964 21 Sheets-Sheet 18

INVENTORS
ROBERT E. BENDL
RICHARD W. BLACK
BY Harry M. Saragovitz,
Edward J. Kelly, Herbert Berl
& James W. Colvin
ATTORNEYS INVENTORS
ROBERT E. BENDL
RICHARD W. BLACK
BY Harry M. Saragovitz, Edward J. Kelly, Herbert Berl & James V. Colvin
ATTORNEYS INVENTORS
ROBERT E. BENDL
RICHARD W. BLACK
BY Harry M. Saragovitz, Edward J. Kelly, Herbert Berl, & James W. Colvin
ATTORNEYS INVENTORS
ROBERT E. BENDL
RICHARD W. BLACK
BY Harry M. Saragovitz, Edward J. Kelly, Herbert Berl, & James W. Colvin
ATTORNEYS 3,285,435

PORTABLE SHIP'S WING FOR CARGO TRANSFER BY HELICOPTER

Richard W. Black, Alexandria, and Robert E. Bendl, Grafton Court, Va., assignors to the United States of America as represented by the Secretary of the Army Filed Nov. 19, 1964, Ser. No. 412,576
11 Claims. (Cl. 214—15)

The invention disclosed herein may be manufactured and used by or for the Government for governmental purposes without payment to me of any royalty thereon.

This invention relates to ship's cargo handling apparatus and has particular reference to a cantilever structure or wing mounted on a cargo ship and used to move cargo loads outboard of the ship to a location at which the cargo loads can be picked up by helicopters for movement of cargo from the ship to shore or to another ship.

While a few ships have been constructed and arranged to provide a helicopter landing platform on the ship itself, the usual cargo ship used for the transportation of military supplies and equipment has no such facility and a helicopter cannot approach such a ship closely enough to pick up cargo loads directly from the ship's deck because of the danger of interference between the helicopter rotor and the rigging and superstructure of the ship.

It therefore becomes necessary to provide a special structure extending outwardly from the ship to provide a location at which cargo loads can be safely picked up or deposited by helicopters, and it is among the objects of the present invention to provide such a structure, hereinafter referred to as a ship's wing.

A further object resides in the provision of a universal type ship's wing that can be mounted on different ships without requiring modification of the ship structure and can be removed from a ship without requiring any changes or modifications to the ship's structure to leave the ship substantially in its original condition.

A still further object resides in the provision of a ship's wing that is movable between a stored position in which it extends along the ship's deck without overhanging the side of the ship and an extended position in which it projects outwardly from the side of the ship a sufficient distance to place its outer end portion far enough from the ship to permit safe helicopter operation in that area.

An additional object resides in the provision of a ship's wing that is foldable to reduce its length when in its stored position and unfoldable to provide its full effective length when in its extended or operative position.

Another object resides in the provision of a ship's wing of the character indicated which includes a power operated dolly or car movable along the wing to carry cargo from the ship's hold to the outer end of the wing where it can be safely picked up by a helicopter or to carry resupply cargo from the outer end of the wing onto the ship for suitable storage.

A somewhat more specific object resides in the provision of manually and automatically controlled hydroelectric power means for moving the dolly back and forth along the wing and automatically preventing over run of the dolly at both ends of its travel.

Yet another object resides in the provision of a ship's wing of the character indicated that can be easily arranged to float in water so that it can be easily moved from shore to ship or from one ship to another and can be picked up by conventional ships cargo handling gear and placed in position for mounting on the ship.

Other objects and advantages will become apparent from a consideration of the following description and the apppended claims in conjunction with the accompanying drawings wherein:

Figure 1:
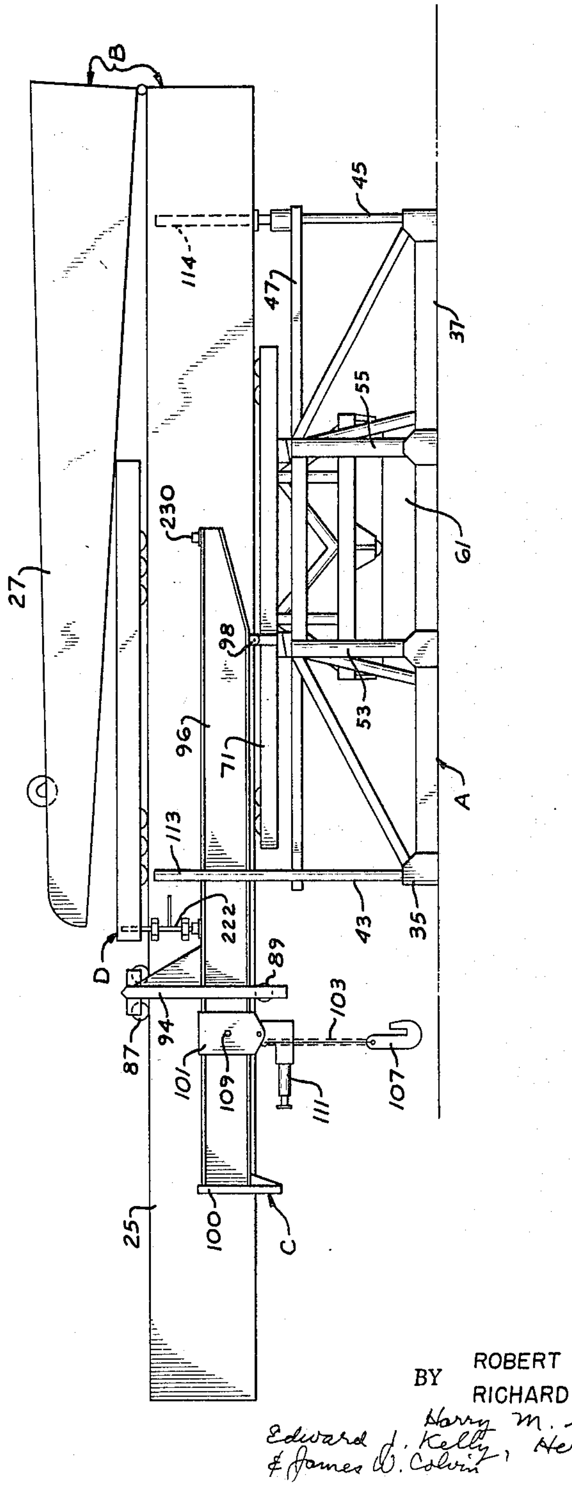
FIG. 1 is a side elevational view of the ship's wing assembly as mounted on a ship's deck and shown in stored condition.
Figure 2:
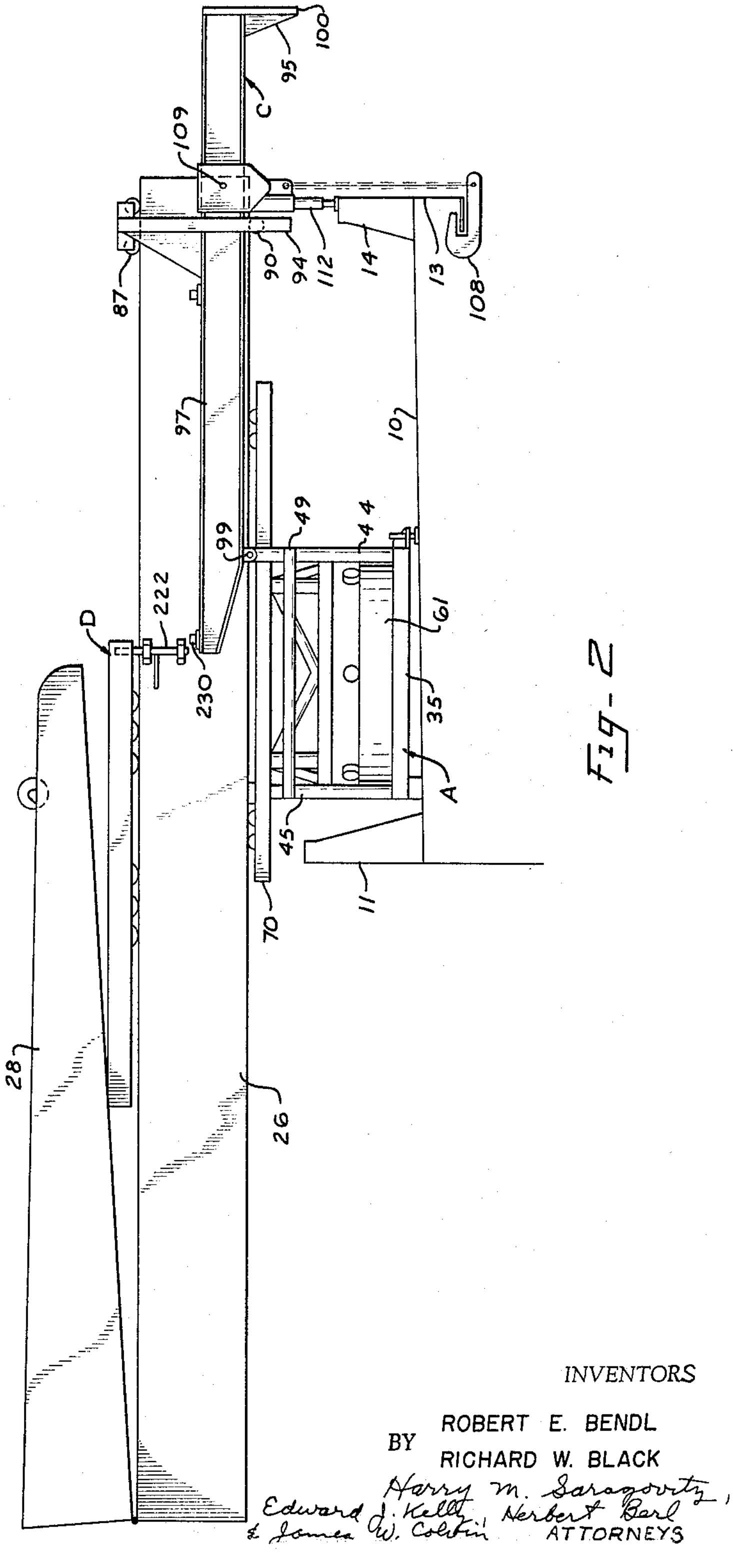
FIG. 2 is an end elevational view of the mounting frame with the girder structure of the wing swung through an angle of 90° from the stored position shown in FIG. 1 and shown in side elevation.
Figure 3:
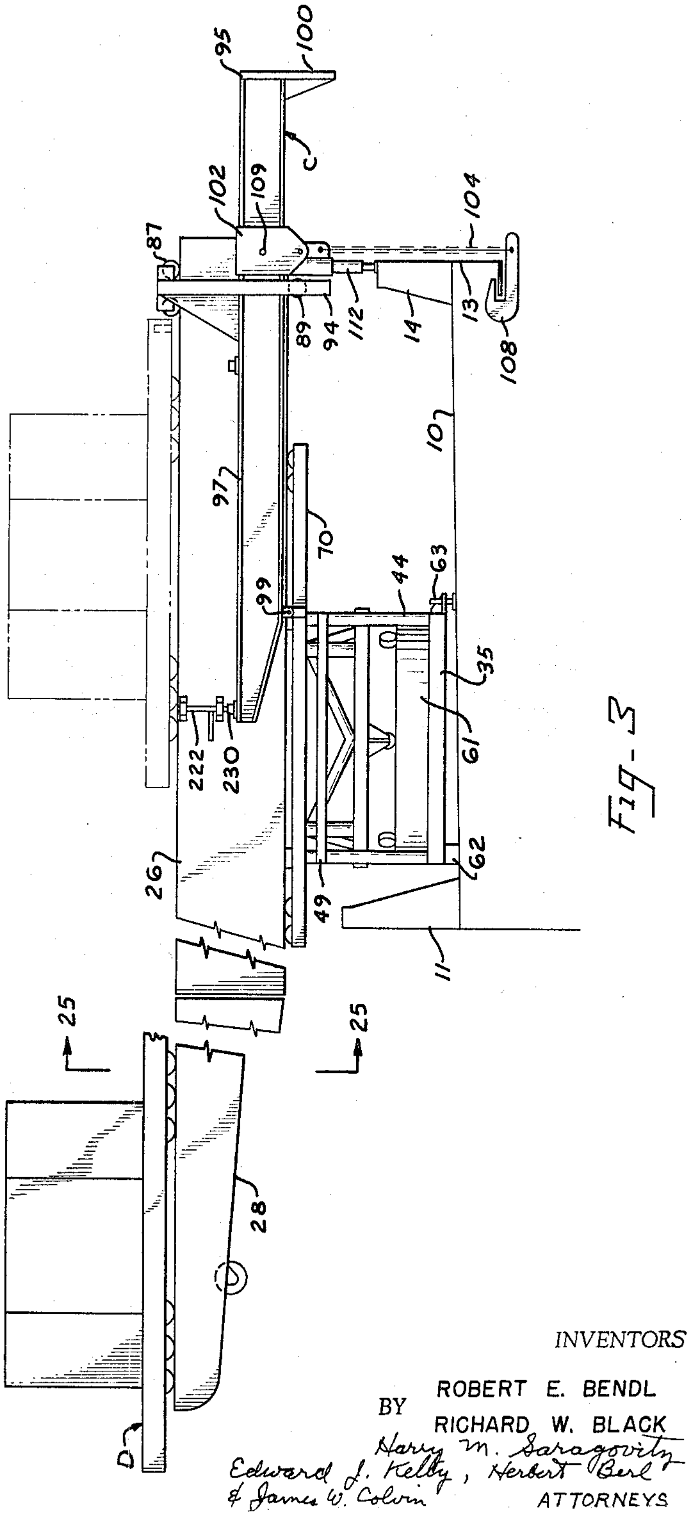
FIG. 3 is an elevational view similar to FIG. 2 but showing the girder structure tied down to the ship at its inner end and unfolded to its operative, outboard projecting condition.

FIGS. 1, 2 and 3 show different positions of the portable cargo wing on the deck of an associated cargo ship. With the wing supporting structure already mounted on the ship's deck, as will be later described in detail, FIG. 1 shows the wing in its folded and stored position on the ship, FIG. 2 shows the wing when swung through an angle of approximately 90° from its stored position to extend outboard of the side of the ship, but still in folded condition, FIG. 3 shows the wing unfolded and in operative position and shows the inboard end of the wing and associated parts of the ship to illustrate the manner in which the inboard end of the wing is tied down to the ship so that the wing can project outboard of the ship in cantilever fashion.

Figure 9:
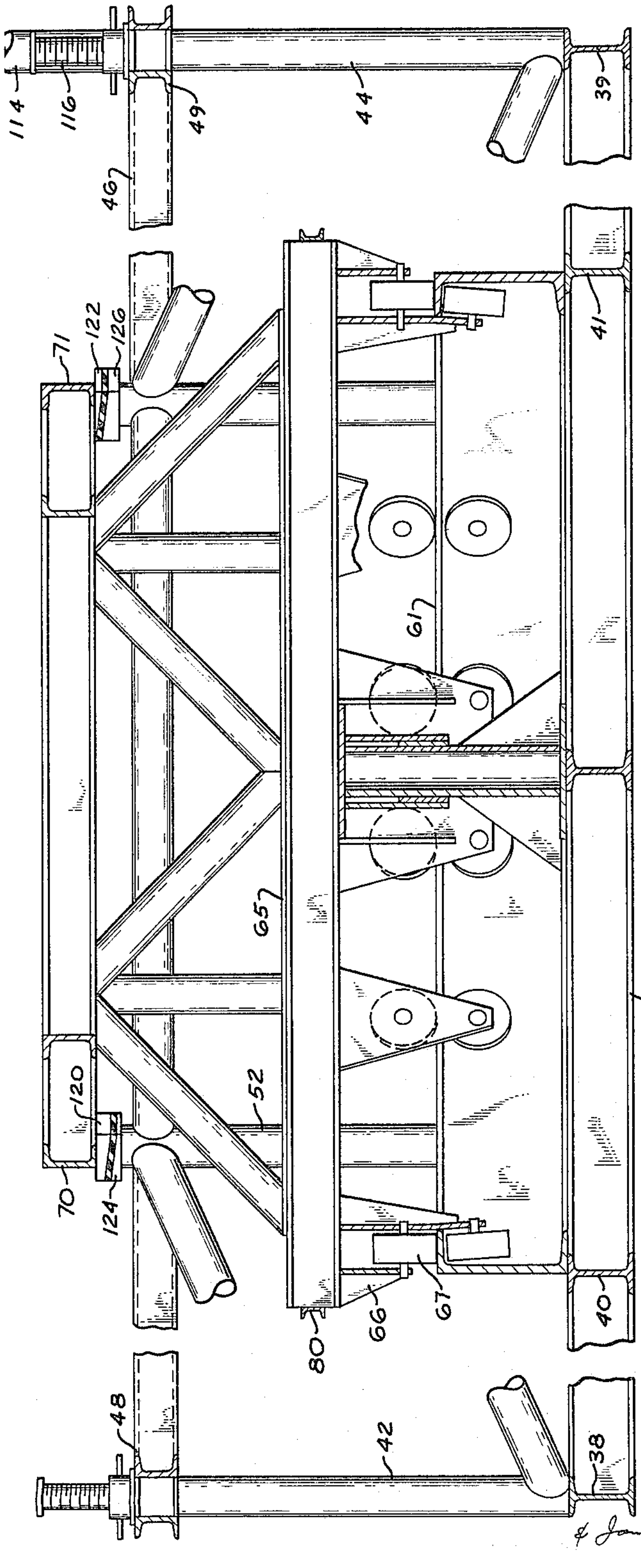
FIG. 9 is a transverse cross sectional view substantially on a plane indicated by the line 9—9 on FIG. 8.
Figure 26:
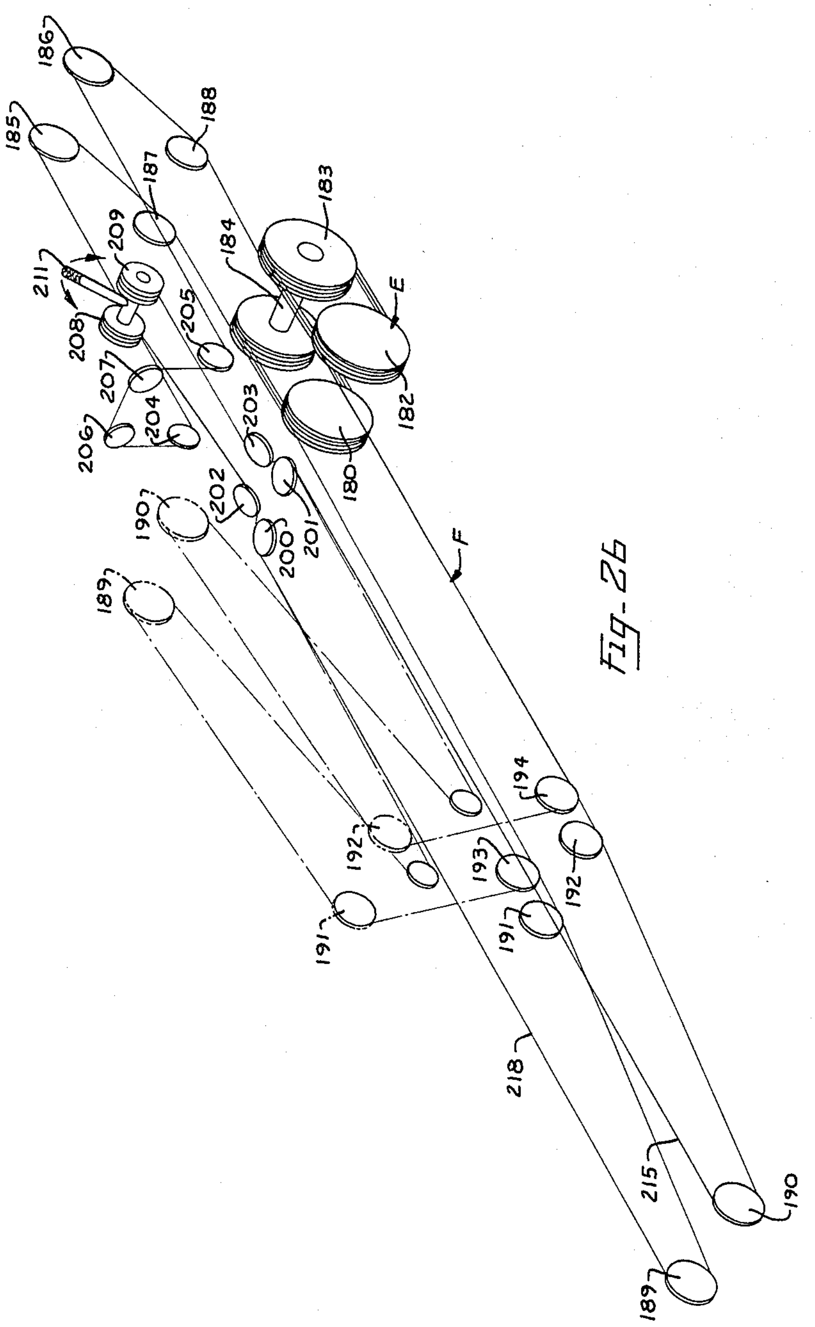
FIG. 26 is a diagrammatic isometric view showing the dolly operating cables and the cable carrying sheaves mounted on the dolly and the girder boom structure.

The wing comprises major assemblies including the support structure generally indicated at A, the two-part, foldable girder structure, generally indicated at B, the tie down structure, generally indicated at C, the load transferring dolly, generally indicated at D, the power and control mechanism, generally indicated at E, FIG. 9, and the dolly driving cable system, generally indicated at F, FIG. 26.

As shown in FIG. 2, the cargo wing is mounted on the ship's deck 10 between the lateral bulkhead or gunwale 11 of the ship and the adjacent side of the cargo hatch 12 through which cargo is passed into and out of the ship's cargo hold.

The hatch is surrounded below the ship's deck with flanged frame beams, as indicated at 13, and above the deck by the hatch combing 14. The ship is provided with hoisting gear, not illustrated, adjacent the hatch 12, the hoisting gear including masts, booms and suitable rigging of the usual character. The rigging is operated by suitable winches, also not illustrated, to raise and swing the booms and run the falls to lower cargo into or raise it out of the hold and place it on the dolly D of the wing assembly.

The girder structure B comprises four hollow beams 25, 26, 27 and 28 of rectangular cross sectional shape having flat top, bottom and side surfaces, transverse and diagonal bracing 29 between the inboard beams 25 and 26 securely holding these beams in parallel, spaced apart and coterminous relationship and similar bracing 30 securing the outboard beams 27 and 28 in parallel, spaced apart and coterminous relationship. The outboard girder structure is hinged at its inner or proximal end to the outer end of the inboard girder structure and suitable hydraulic mechanism, to be later described in detail, is provided to move the outboard section about the hinge axis from its folded over position shown in FIGS. 1 and 2 and its unfolded or operative position shown in FIG. 3. A grid or grill 31 is disposed between the beams 25 and 26 of the inner girder structure and a similar grid 32 is disposed between the beams 27 and 28 of the outer girder structure, these grids providing a walkway from one end to the other end of the girder structure when the girder structure is unfolded and in operative position.

In order to understand how the girded structure is moved between its stored position, FIG. 1 and its operative position, FIG. 3, a detailed description of the supporting structure A and the girder hinge structure is necessary.

The support structure is fully illustrated in FIGS. 5 to 11 inclusive and comprises a stationary base 35 of generally rectangular shape adapted to be mounted in fixed position on the ship's deck. This frame includes a lower frame comprising elongated side members 36 and 37 disposed in parallel, spaced apart and coterminous relationship, and end members 38 and 39 extending between the side members one at each end of the base. Spaced apart intermediate members 40 and 41 extend between the side members at respectively opposite sides of the mid-length location of the base and this structure is suitably reinforced by braces extending across the corner portions of the rectangular spaces between the two intermediate members.

Tubular corner posts 42, 43, 44 and 45, extend upwardly one from each corner of the lower frame and these corner posts are secured at their upper ends to and support an upper fixed frame of substantially the same size and shape as the lower frame. This upper frame has side members 46 and 47 and end members 48 and 49 arranged in the same manner as the corresponding components of the lower frame. The side members are shown as composite members each including a central tubular portion and end portions of channel cross section. Four tubular posts 52, 53, 54 and 55 extend upwardly one from each corner of the rectangular space between the intermediate members 40 and 41 of the lower frame to the side members 46 and 47 of the upper frame. The lower and upper frames are secured in position relative to each other by suitable diagonal reinforcements, as indicated at 56, which may be in the form of tubular braces welded at their ends to the upper frame of the stationary base and to corresponding ends of the tubular posts.

A circular track 61 is mounted at its lower edge on the side and intermediate members and the corner braces of the lower fixed frame.

A wooden timber 62 is secured to the under side of lower frame side member 36 to rest on the ship's deck, and leveling screws, as indicated at 63, are secured to side member 36 for leveling the supporting frame on the deck. These leveling screws are preferably engaged with cleats or similar devices secured to the deck to hold the supporting structure against movement relative to the ship.

The rotating base or turntable comprises a structural foundation 65 of octagonal shape disposed immediately above the circular track 61 and provided with depending journal brackets, as indicated at 66. Turret wheels or rollers, as indicated at 67, are journalled on the brackets, some of the rollers riding on the top surface of the top flange of the channel shaped track 61 and some being disposed just below and engageable with the bottom surface of the top flange of the track to maintain the rotating base on the track, as shown in FIG. 9.

Figure 6:
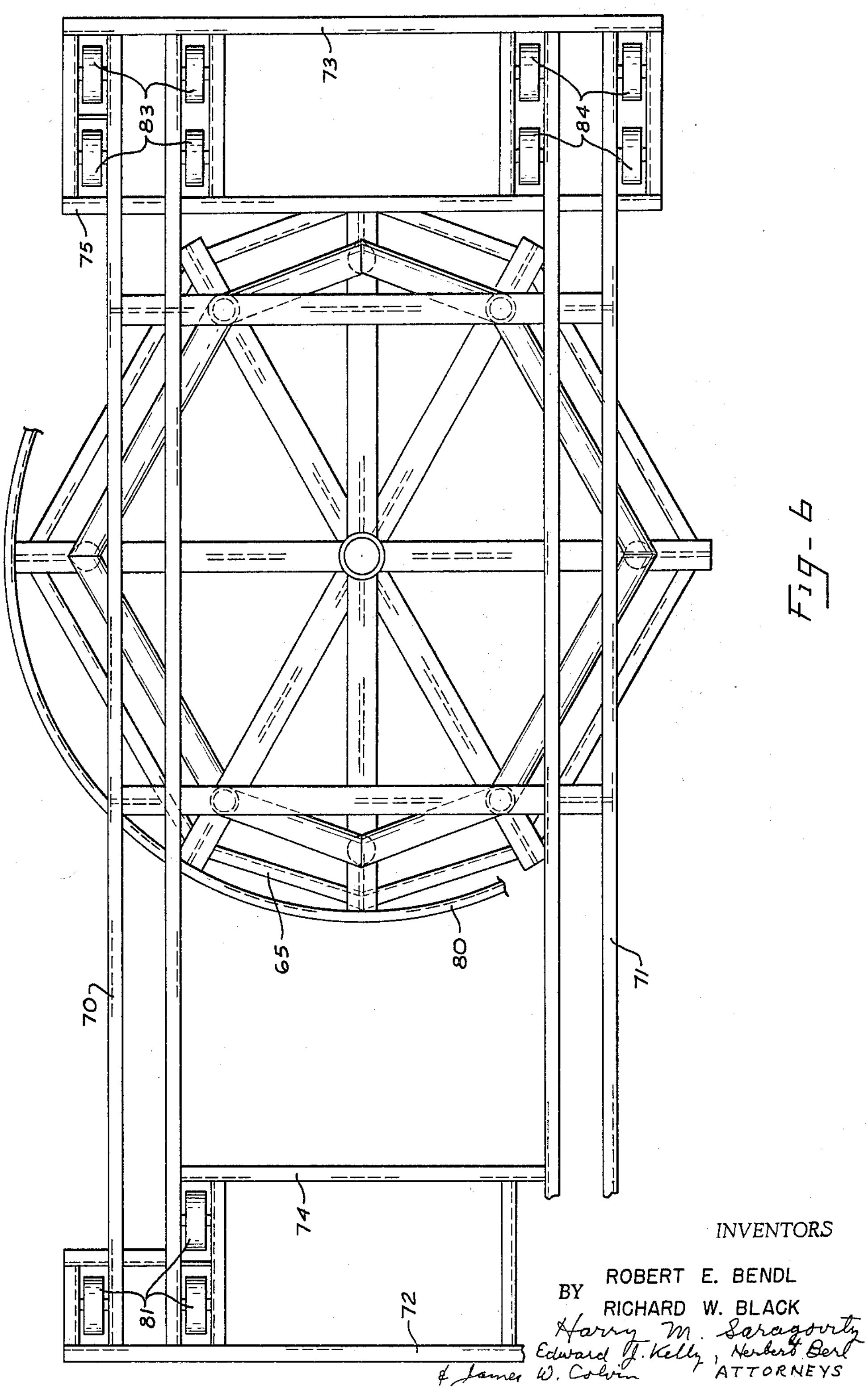
FIG. 6 is a top plan view of the rotatable turntable portion of the mounting frame.

A rectangular rotating base or turntable frame including side members 70 and 71 held in parallel, spaced apart and coterminous relationship by transverse end members 72 and 73 and transverse intermediate members 74 and 75, FIG. 6, is supported on the foundation formation 65 of the rotating base by a suitable intermediate frame work, particularly shown in FIG. 9. The turntable is rotated on the fixed base structure by suitable means illustrated as a hand operated winch 78, FIG. 8, winding a cable 79, which extends around a circular cable track 80 secured to and surrounding the turntable structure below the rectangular turntable frame. The cable track 80 is of channel cross sectional shape having an outwardly facing groove and the cable 79 is secured to the track at at least one location.

Figure 12:
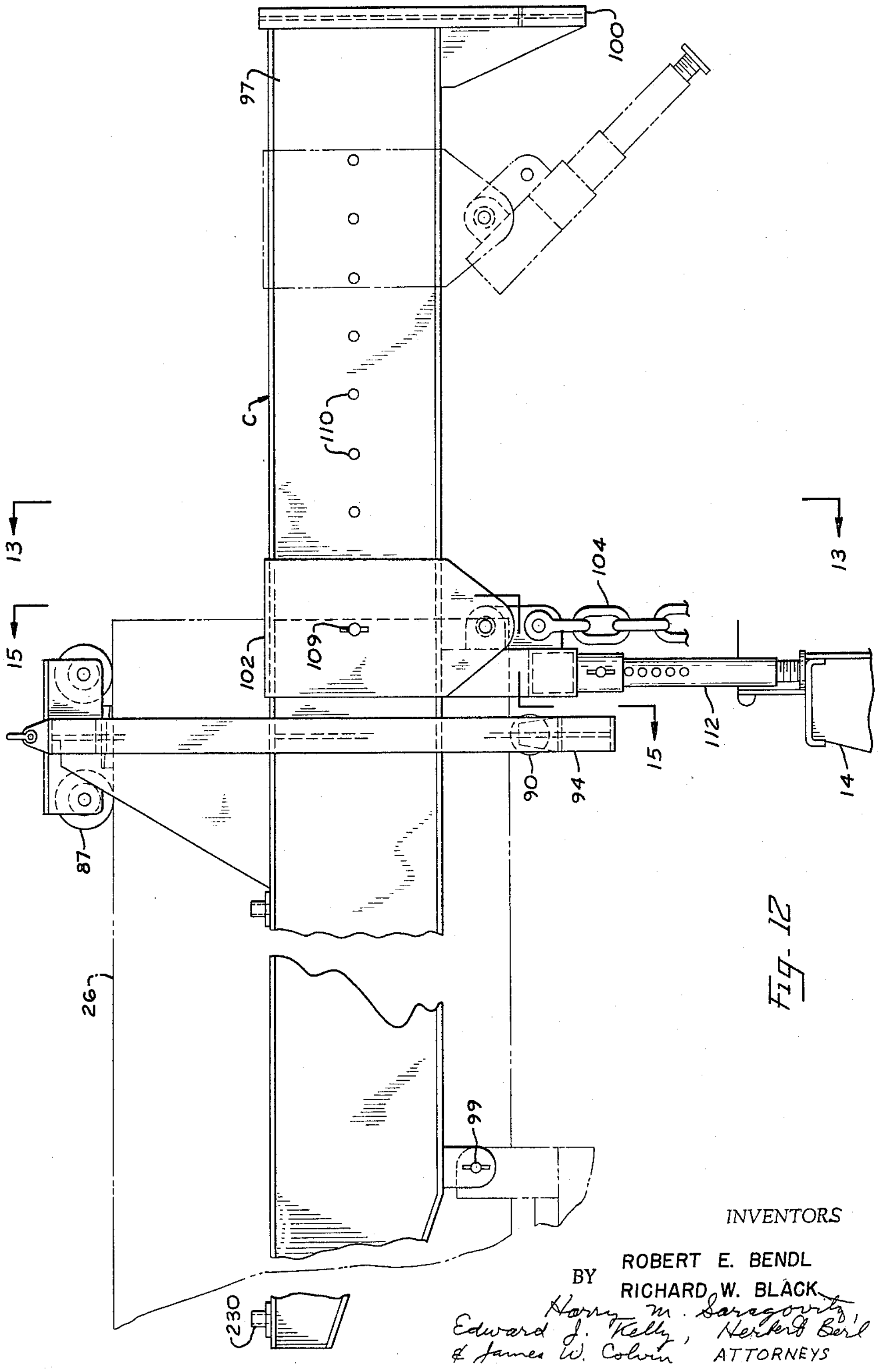
FIG. 12 is a fragmentary side elevational view on an enlarged scale showing the tie down mechanism for the girder boom.

The turntable frame side members 70 and 71 are provided near their opposite ends with rollers, as indicated at 81, 82, 83 and 84 and the bottom surfaces of the girder beams 25 and 26 of the inner section of the girder structure B rest on these rollers so that the girder structure can be moved longitudinally on the turntable. The inboard portion of the girder structure is held down on the turntable frame by a rectangular frame 94, FIG. 12, constituting a component of the tie down assembly C. The frame 94 has a top bar 85 extending transversely across the top surface of the beams 25 and 26 near the inboard end of the girder structure and carries pairs of rollers 86 and 87 which bear on the top surface of these girders. The bottom bar 88 extends transversely below the bottom surfaces of the girders 25 and 26 and carries rollers 89 and 90 which engage the bottom surfaces of the girders at such times as the inboard ends of the girders may be forced downwardly as by rolling of the ship. The top and bottom bars 85 and 88 are secured together by the vertical side members 91 and 92 constituting the rectangular frame 94.

Figure 4:
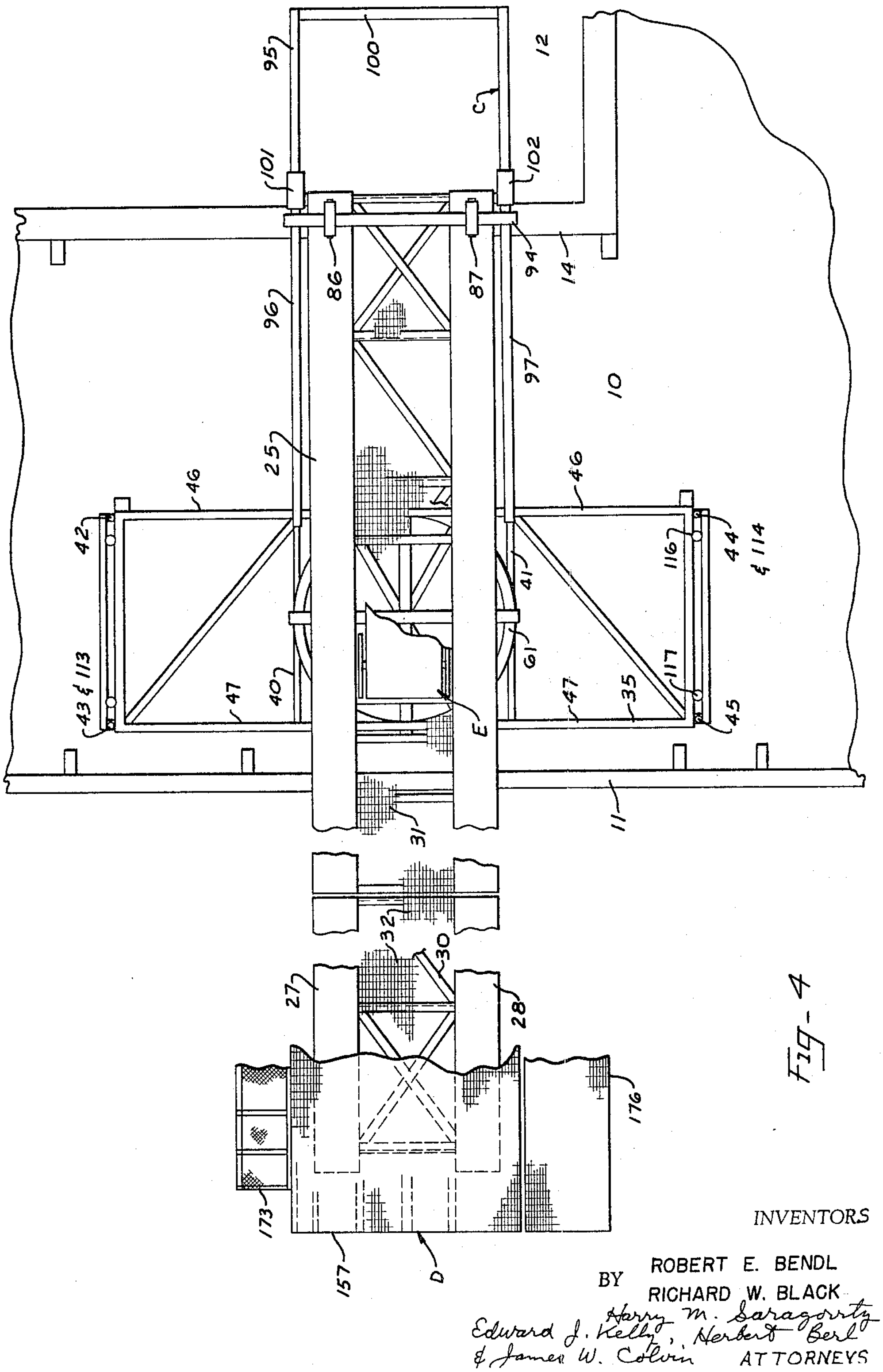
FIG. 4 is a top plan view of the ship's wing assembly in the operative position shown in FIG. 3.
Figure 5:
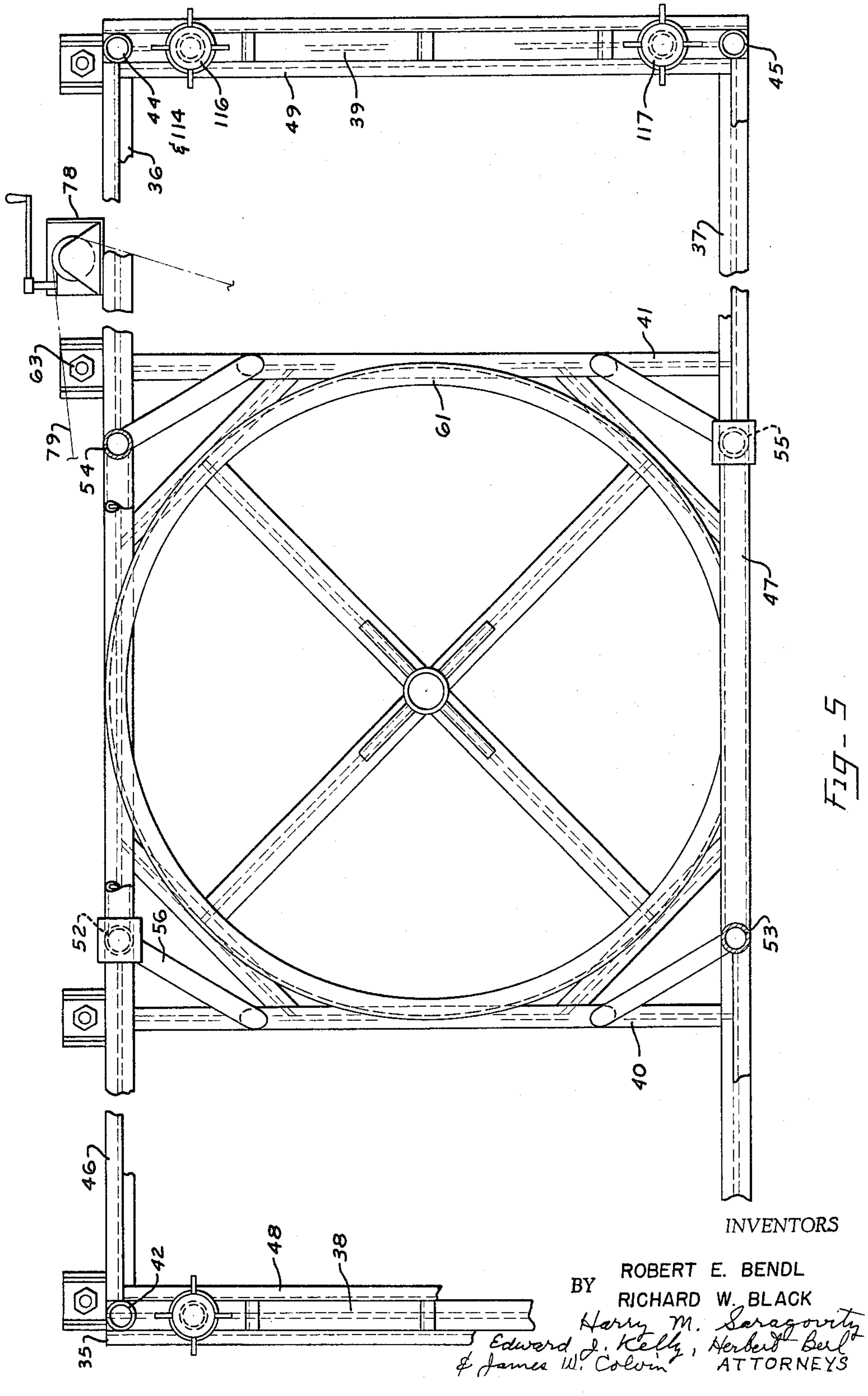
FIG. 5 is a top plan view of the stationary base portion of the mounting frame.

Frame 94 is rigidly mounted within a generally horizontal, U-shaped frame 95, FIG. 4, having parallel legs 96 and 97 disposed respectively at the outer sides of the frame side members 70 and 71 and pivotally connected at their forward ends to the corresponding side members by pin connections 98 and 99. A cross bar 100 extends between the rearward or inboard ends of the legs 96 and 97.

With this arrangement the inboard end of the girder structure can be slid onto the turntable frame and through the vertical frame 94 and there are no fixed or permanent connections between the girder structure and the turntable. The girder structure can also be moved longitudinal on the turntable by the power plant and cable assemblies, in a manner to be later described.

Saddle members 101 and 102 are slidably mounted on the frame legs 96 and 97 respectively and tie down chains 103 and 104 are secured to these saddle members and depend from the saddle members. Hooks 107 and 108 are secured to the lower ends of the chains 103 and 104 and are engageable with the bottom flange of the adjacent hatch frame beam 13 to tie down the inboard end of the girder structure. The saddle members are slidable along the frame legs to selected positions of adjustment and are secured in adjusted position by suitable means, such as pins, one of which is indicated at 109, extending through apertures in the corresponding saddle member and a selected one of a series of apertures, as indicated at 110, extending through and spaced apart longitudinally of the corresponding leg of the U-shaped tie down frame.

Figure 13:
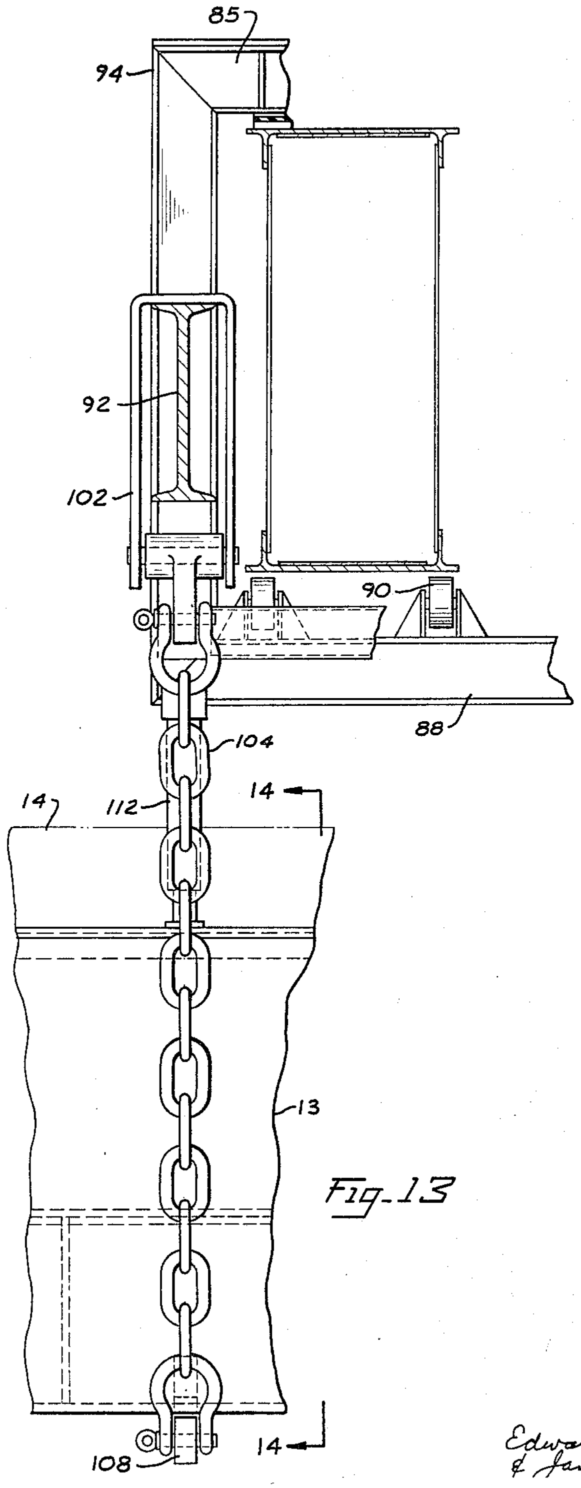
FIG. 13 is a fragmentary cross sectional view substantially on planes indicated by the line 13—13 on FIG. 12.
Figure 14:
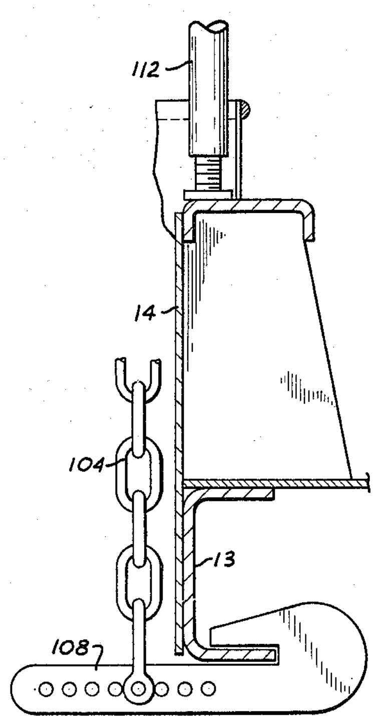
FIG. 14 is a fragmentary cross sectional view substantially on a plane indicated by the line 14—14 on FIG. 13.
Figure 16:
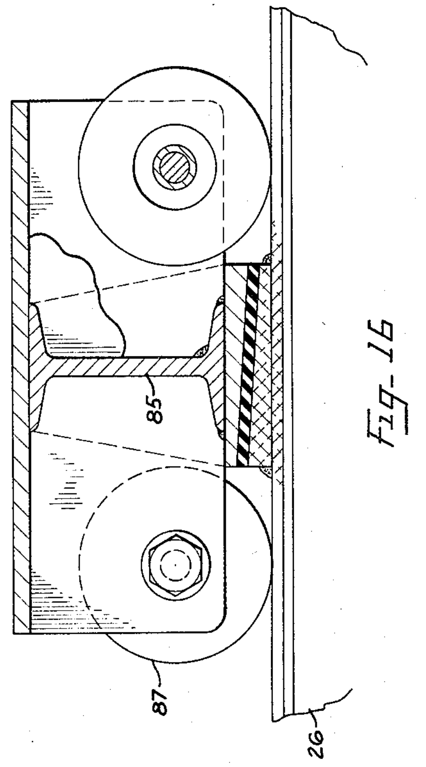
FIG. 16 is a fragmentary cross sectional view substantially on a plane indicated by the line 16—16 on FIG. 15.
Figure 15:
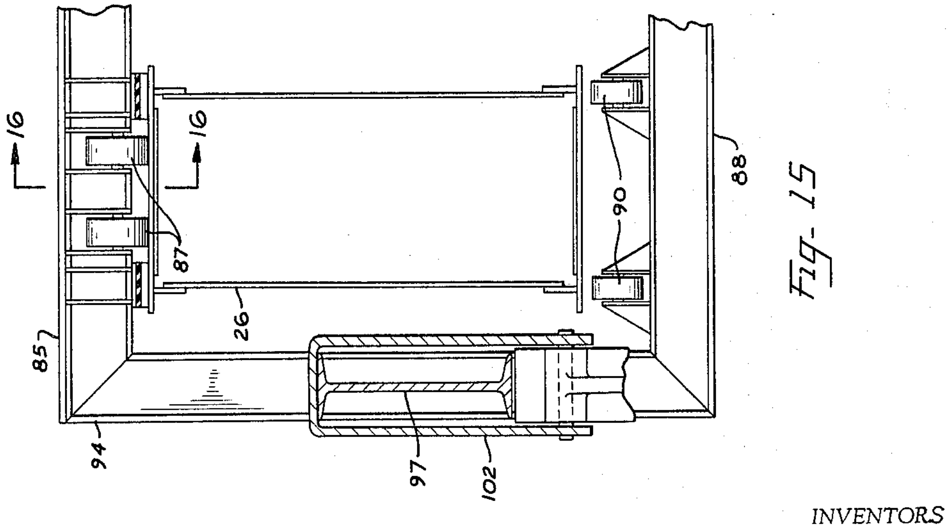
FIG. 15 is a fragmentary cross sectional view substantially on the plane indicated by the line 15—15 on FIG. 12.
Figure 17:
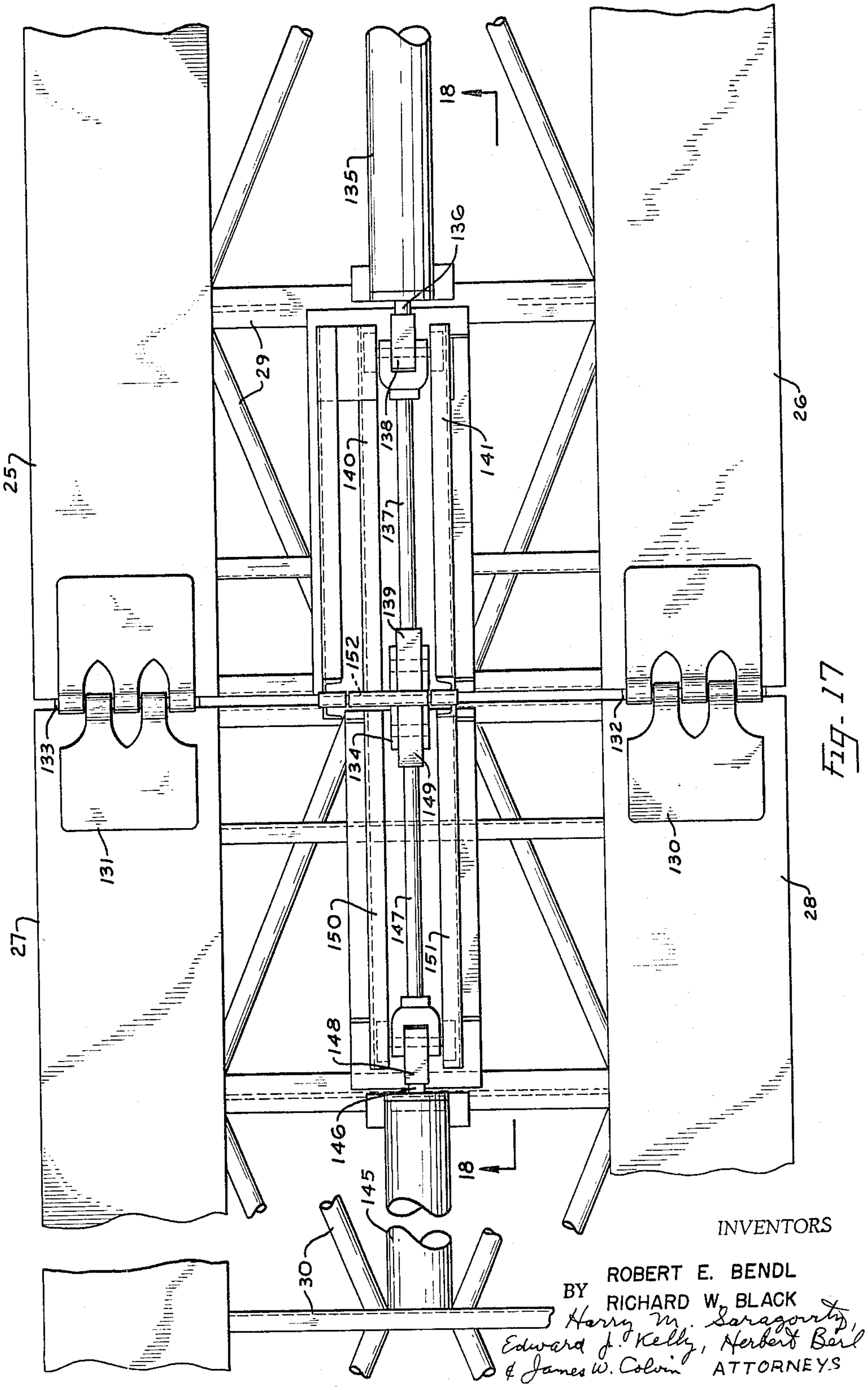
FIG. 17 is a fragmentary top plan view on an enlarged scale showing the hinge joint area of the foldable girder boom.

Screwjacks 111 and 112 are pivotally secured at their upper ends one to each of the saddle members 101 and 102 and depend from the saddle members. When the wing is operatively tied down, as shown in FIGS. 13 and 14, the bottom ends of the screwjacks rest on the top of the adjacent hatch combing and by adjusting the screwjacks 111 and 112 the girder structure can be leveled and the chains 103 and 104 tightened to firmly hold the extended girder structure in cantilever condition.

When the turntable carrying the girder structure is turned from the outboard to the stored position, this turning movement is limited by staffs 113 and 114 inserted into and extending upwardly from the corner posts 43 and 44 of the fixed base frame. When the turntable supported girder structure reaches its stored position, the sides of the girder structure contact the staffs 113 and 114 to limit the turning movement. Four screwjacks or locking screws, two of which are indicated at 116 and 117, mounted on the fixed base frame near the corner posts are screwed up under the girder structure beams 25 and 26 to hold the girder structure in its stored position. If desired four padded hooks, as indicated at 115, may be secured to the turntable frame, two at each opposite side of the frame and engaged with the outside bottom flanges og girders 25 and 2 6to assist in holding the girder structure in place on the turntable.

Figure 7:
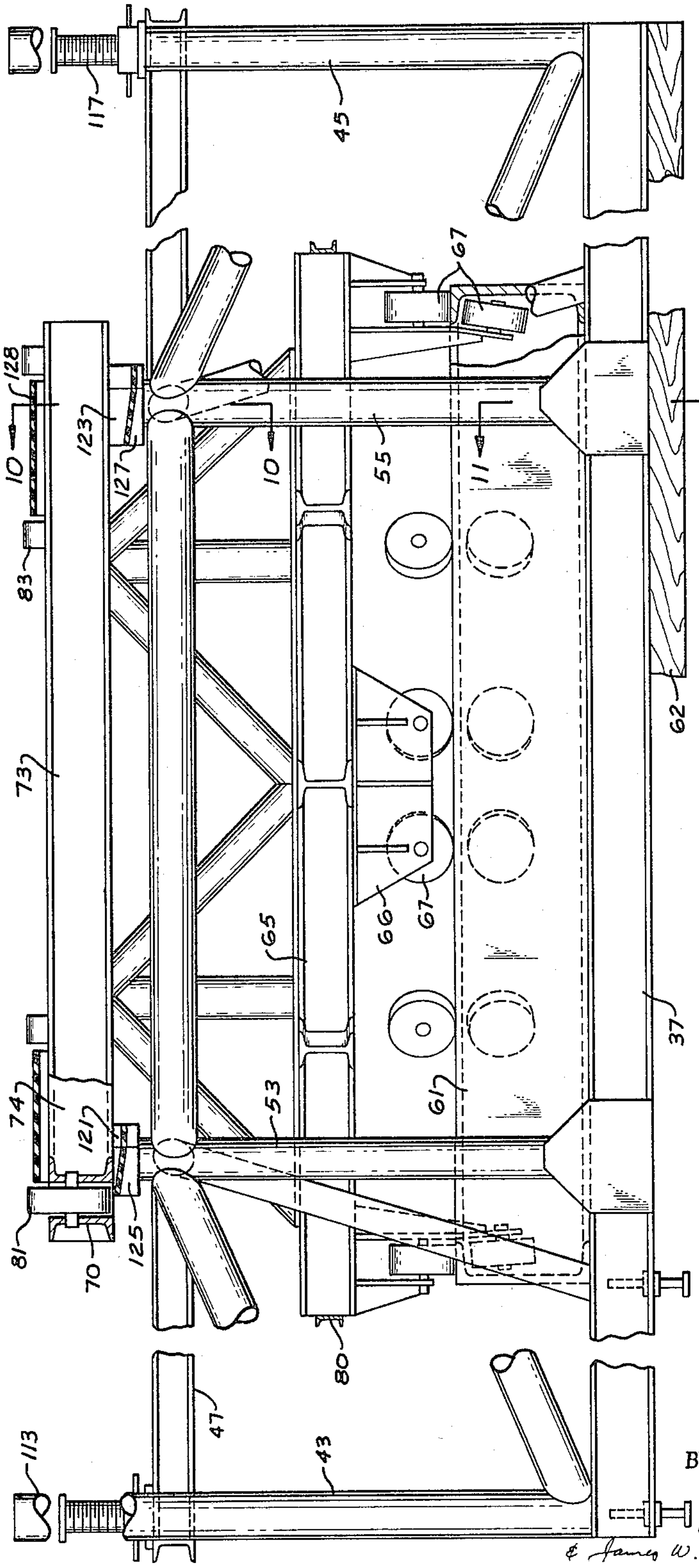
FIG. 7 is a side elevational view on an enlarged scale of the entire mounting frame in assembled condition.
Figure 11:
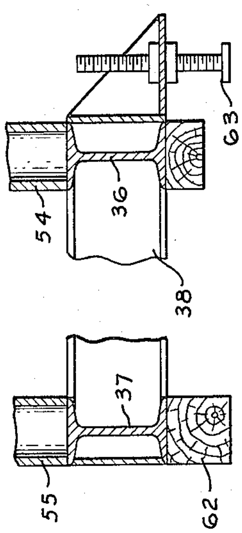
FIG. 11 is a fragmentary cross sectional view substantially on a plane indicated by the line 11—11 on FIG. 7.
Figure 10:
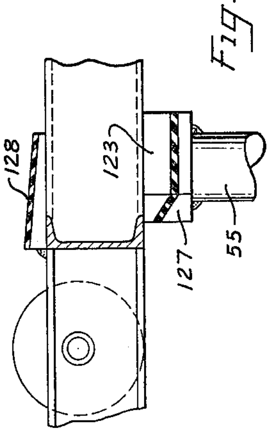
FIG. 10 is a fragmentary cross sectional view substantially on a plane indicated by the line 10—10 on FIG. 7.
Figure 8:
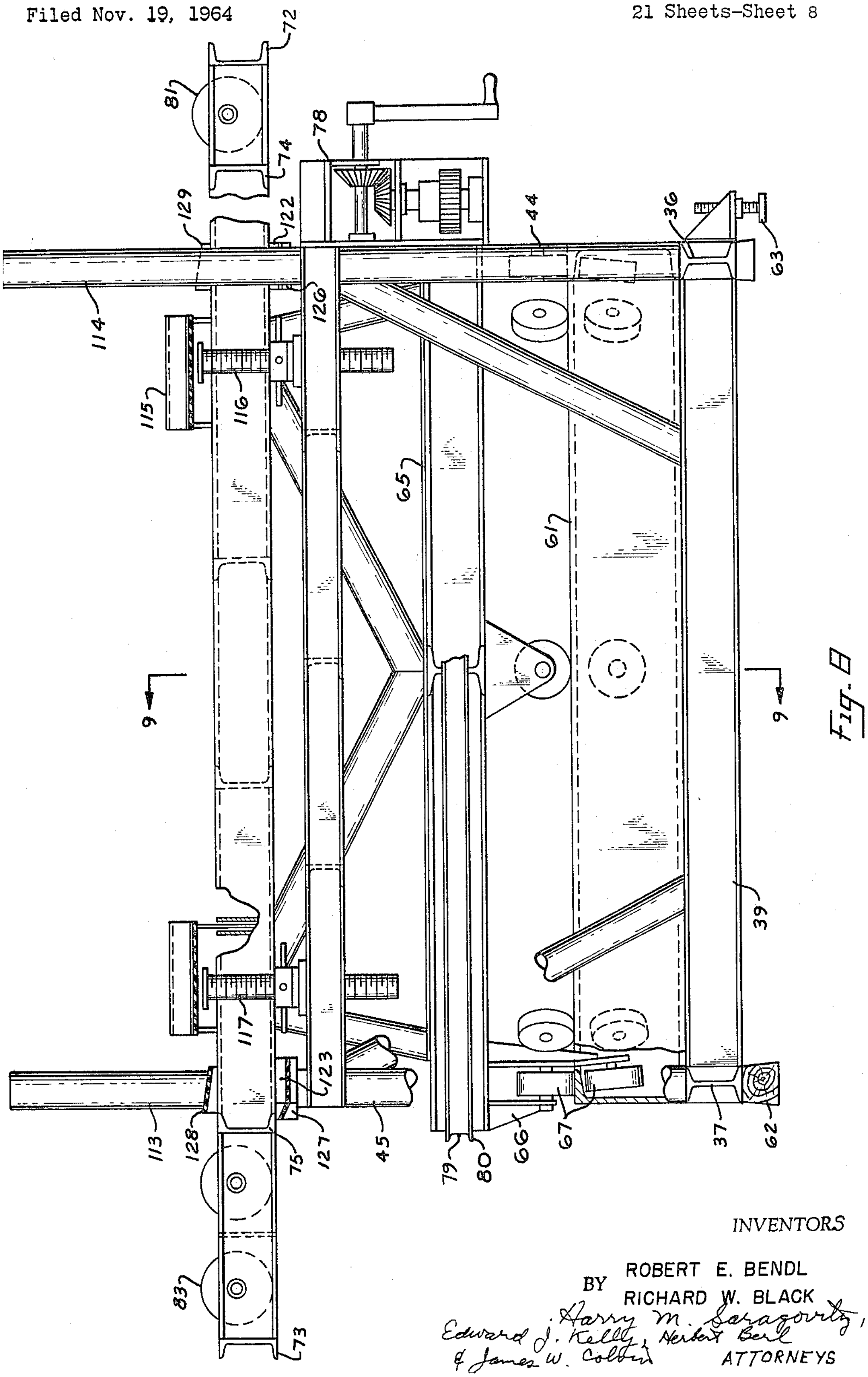
FIG. 8 is an end elevational view of the assembled mounting frame shown in FIG. 7.

Before the wing is moved from its stored position, the locking screws are turned down to release the beam structure and the turntable. The hand winch 78 is then operated to turn the turntable with the folded girder structure thereon through an angle of approximately 90°. When the turntable reaches the operative position of the wing, four inclined or wedge-shaped pads, 120, 121, 122 and 123 on the turntable frame engage four corresponding inclined or wedge-shaped pads, 124, 125, 126 and 127 on the upper ends of the frame posts 52, 53, 54 and 55 respectively. As shown in FIG. 7, the pad 124 is higher than the pad 125 so that pad 120 on the turntable frame can pass over pad 125 and engage pad 124 and pad 121, extending downward further than pad 120, will engage the lower frame pad 125 at the outer side of the frame. The same arrangement is provided at the inner side of the frame. With this arrangement cantilever loads on the wing will be transferred to the deck through the pads 120 to 127 inclusive and the posts 52 to 54 inclusive and the rollers, as indicated at 81 to 84 inclusive, do not have to be made sufficiently strong to carry these loads. After the girder structure has been swung to position to project outwardly from the side of the ship it is moved longitudinally on the turntable frame by the power winch 125 until the inboard end of the U-shaped frame 95 is in proper position for tie down.

Stops for this longitudinal movement of the girder structure on the turntable frame are provided in the form of wedge-shaped pads 128 and 129 on the upper surfaces of the turntable frame side members and cooperating wedge-shaped pads, on the bottom surfaces of the girder beams 25 and 26. After the tie down frame has been brought into position the saddle members 101 and 102 may be adjusted, if necessary, and the tie down linkage connected and adjusted as described above. This will firmly hold the wing in position transverse to the deck and the next step is to unfold the girder structure. The tie down linkage is shown in detail in FIGS. 12, 13 and 14 and includes the chains 103 and 104, hooks 107 and 108 and jacks 111 and 112.

Referring now to FIGS. 17, 18, 19 and 20, the abutting ends of the two girder sections are interconnected by hinges 130 and 131 disposed on the top surfaces and firmly secured to the girder beams. Hinge 130 connects beams 26 and 28 and hinge 131 connects beams 25 and 27 and both hinges have a width less than the width of the top surfaces of the corresponding beams by an amount sufficient to provide at each side of each hinge a trackway for the wheels of the load carrying dolly D. The two hinges 130 and 131 have a common hinge axis and separate hinge pins 132 and 133. A lever 134, of generally triangular shape is connected at one end to a hinge pin 152 disposed substantially midway between the parallel girder beams and supported by intergirder frames.

Figure 21:
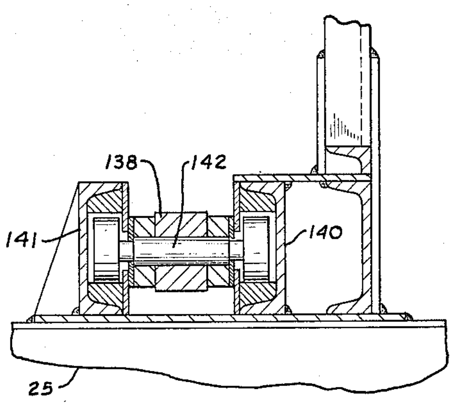
FIG. 21 is a fragmentary cross sectional view substantially on a plane indicated by the line 21—21 on FIG. 20.

A hydraulic cylinder 135 is centered between the girder beams 25 and 26 substantially parallel to the longitudinal axis of the inboard section of the girder structure, and a piston rod 136 projects from the end of the cylinder nearest the hinge connection. The projecting end of the piston rod is connected to one end of a link rod 137 by a pivotal connection 138 the other end of the link rod being connected by a pivotal connection 139 to the distal end of lever 134. A pair of guide ways 140 and 141 are disposed one at each side of and parallel to the link rod 137, the hydraulic cylinder and the guide ways being rigidly secured to the inter beam framework 29 of the inboard section of the girder structure. The cross head guides are of channel shaped cross section and the pivotal connection 138 actually constitutes a cross head, as shown in FIG. 21. The pivot pin 142 is extended in length beyond the bifurcated end portion of the link rod 137 and carries rollers 143 and 144, one on each end thereof, which rollers roll in the cross head guides 140 and 141 to maintain a straight line movement of the pivotal connection 138. The link rod 137 swings about the pivotal connection 138 as lever 134 swings about its pivotal mounting on hinge pin 152.

A second hydraulic cylinder 145 is centered between the beams 27 and 28 of the outboard section of the girder structure and has a piston rod 146 the projecting end of which is pivotally connected to one end of a link rod 147 by a pivotal connection 148. The other end of the link rod is connected by a pivotal connection 149 to the distal end of lever 134. Cross head guides 150 and 151 extend from the end of hydraulic cylinder 145 toward the hinge connection between the two girder sections and the pivotal connection 146 constitutes a cross head cooperating with the cross head guides 150 and 151 in the manner described above.

Figure 18:
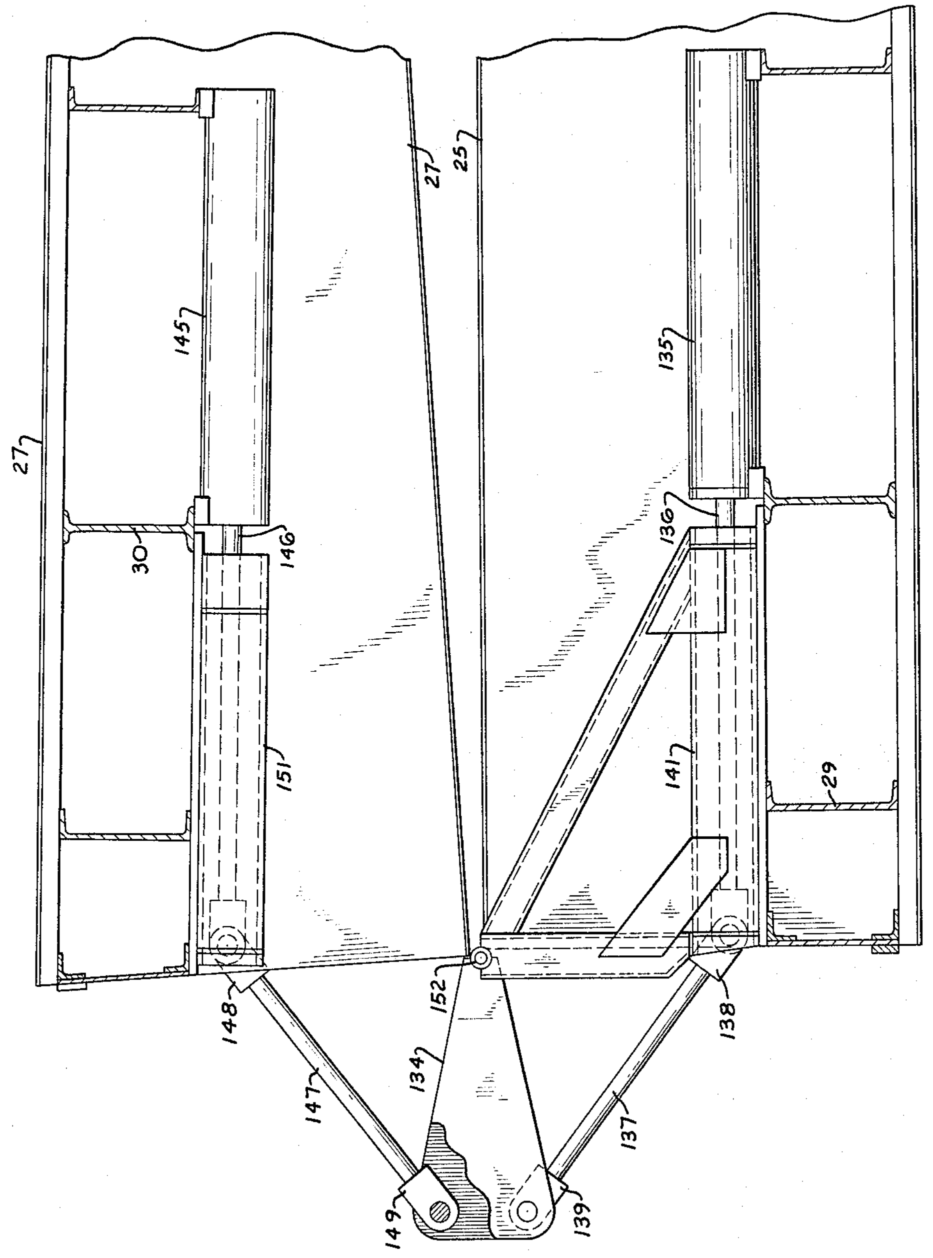
FIG. 18 is a fragmentary cross sectional view substantially on a plane indicated by the line 18—18 on FIG. 17 showing the girder boom structure in folded condition.
Figure 19:
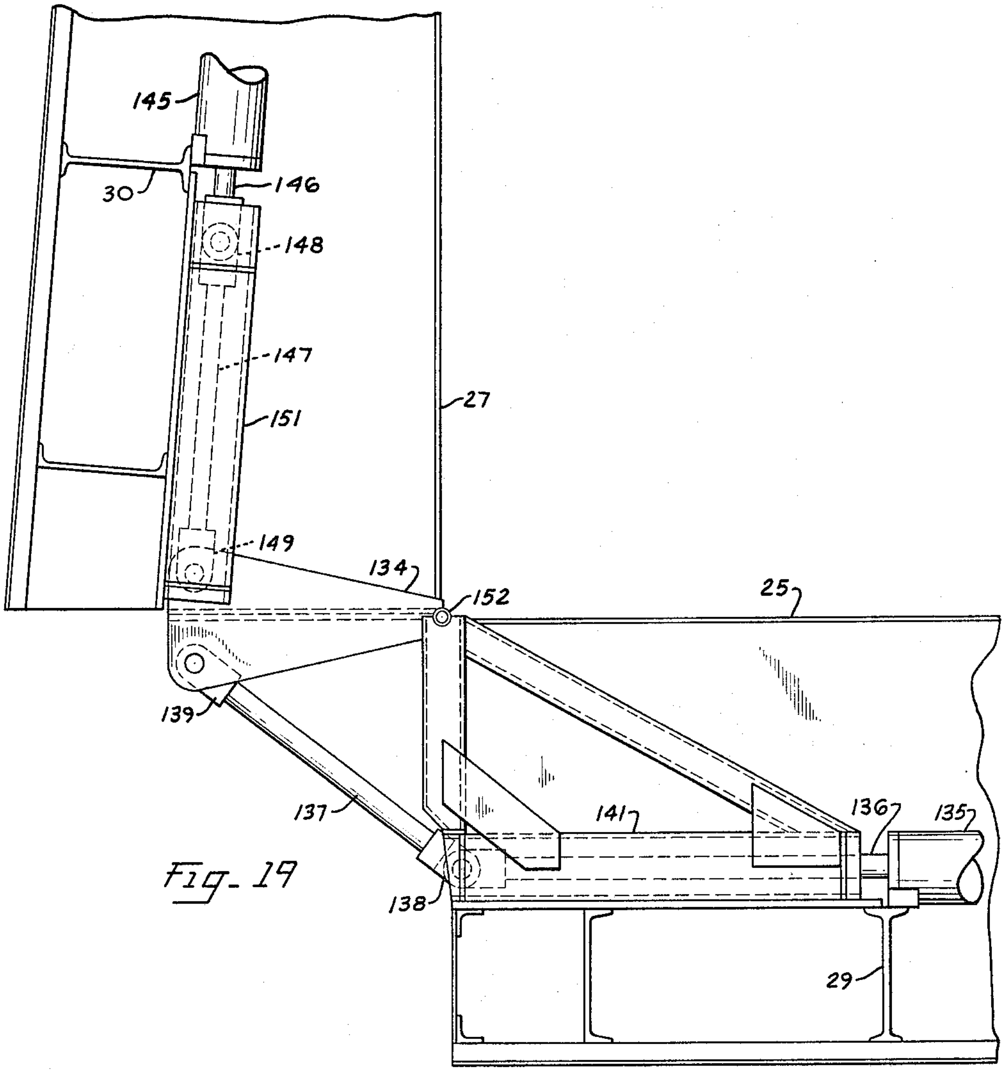
FIG. 19 is a fragmentary cross sectional view similar to FIG. 18 but showing the girder structure in half folded condition.
Figure 22:
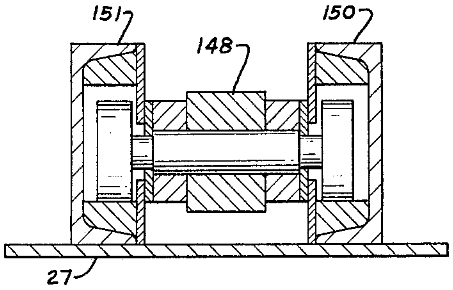
FIG. 22 is a fragmentary cross sectional view substantially on a plane indicated by the line 22—22 on FIG. 20.
Figure 20:
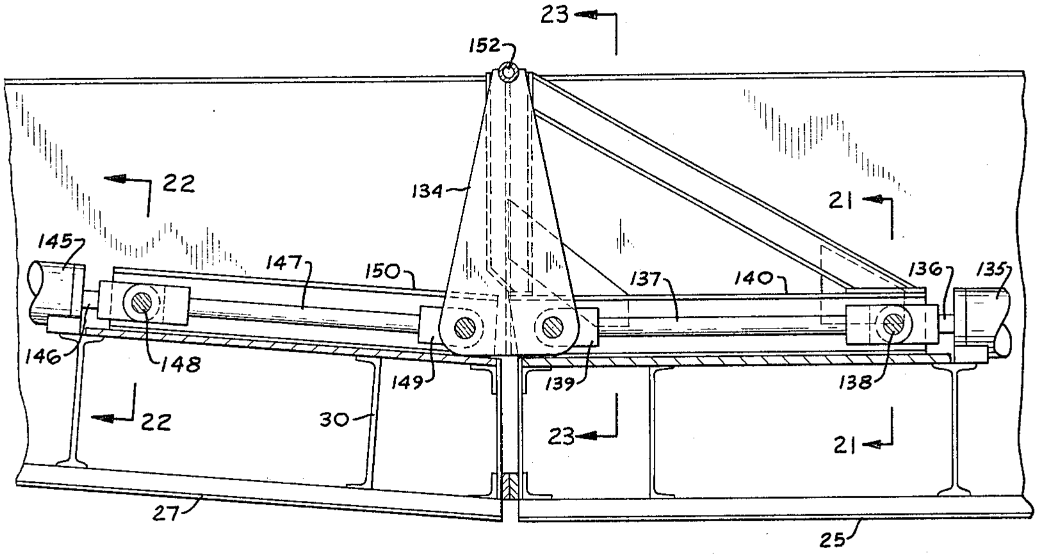
FIG. 20 is a fragmentary cross sectional view similar to FIG. 18 but showing the girder boom structure in fully unfolded condition.
Figure 23:
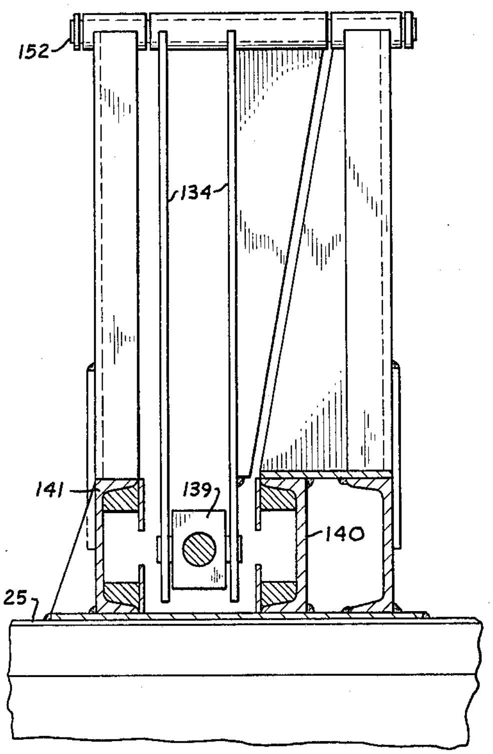
FIG. 23 is a fragmentary cross sectional view substantially on a plane indicated by the line 23—23 on FIG. 20.

After the folded girder structure has been swung by the turntable from its stored position in which it extends longitudinally of the deck to its position in which it is disposed transversely of the deck, it is unfolded from its folded condition shown in FIG. 18 through its intermediate position shown in FIG. 19 to its unfolded condition shown in FIG. 20.

When the girder is in folded condition both piston rods are fully extended out of their corresponding cylinders. To unfold the girder, pressure fluid is applied from the hydraulic-electric power plant 125 under manual control, to the hydraulic cylinder 145 to retract the piston rod 146 into this cylinder. This raises the outboard section from its prone or folded position to an intermediate position in which it extends upwardly from the outer end of the inboard section as shown in FIG. 19. The application of pressure fluid is then automatically changed to cylinder 135 to lower the outboard section to its extended or operative position, as shown in FIG. 20. Both cylinders are double acting so that a throttled discharge of hydraulic fluid from the exhaust end of cylinder 135 serves to cushion the descent of the outboard girder section from its upstanding position to its operative position in which it constitutes a horizontal extension of the inboard section. Folding of the girder structure is substantially the reverse of the unfolding operation described above, the pressure fluid being first applied to cylinder 135.

Figure 24:
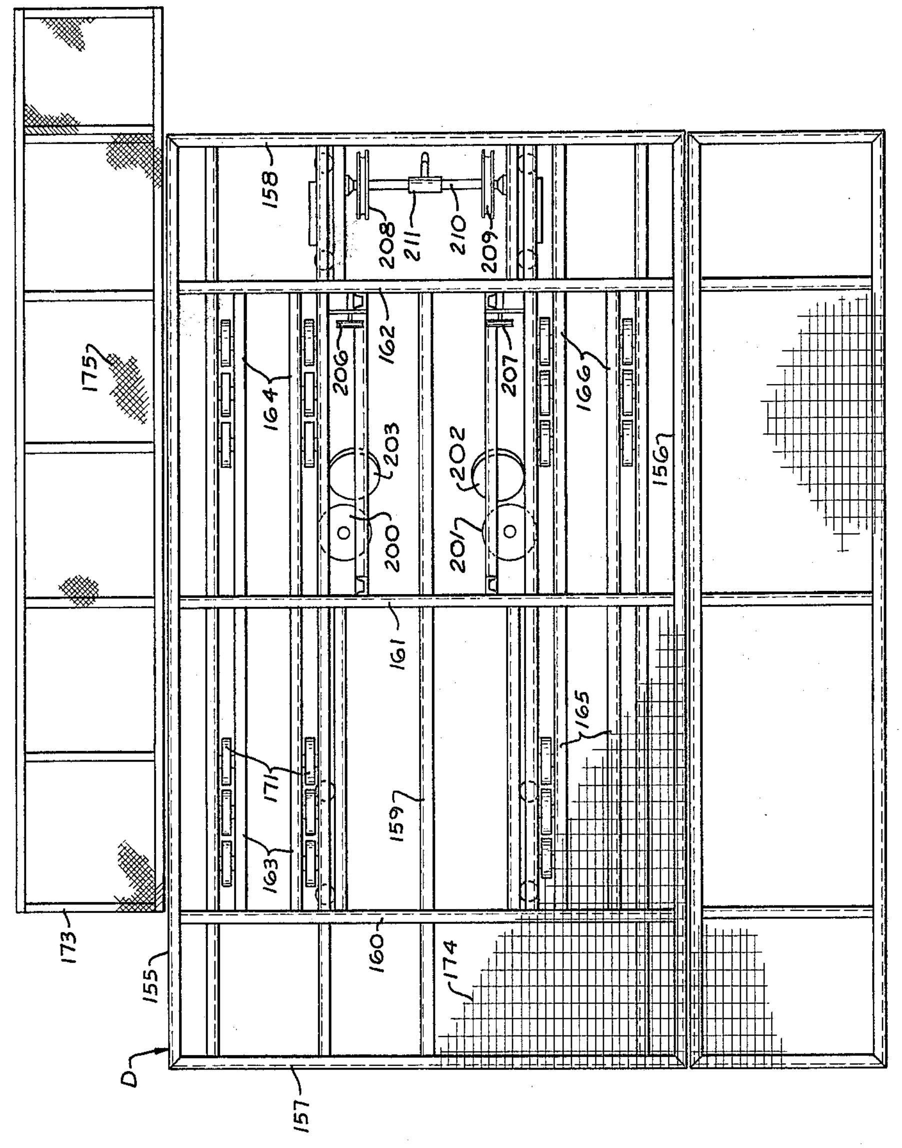
FIG. 24 is a top plan view of a load carrying dolly or car used to carry cargo loads along the boom structure.
Figure 25:
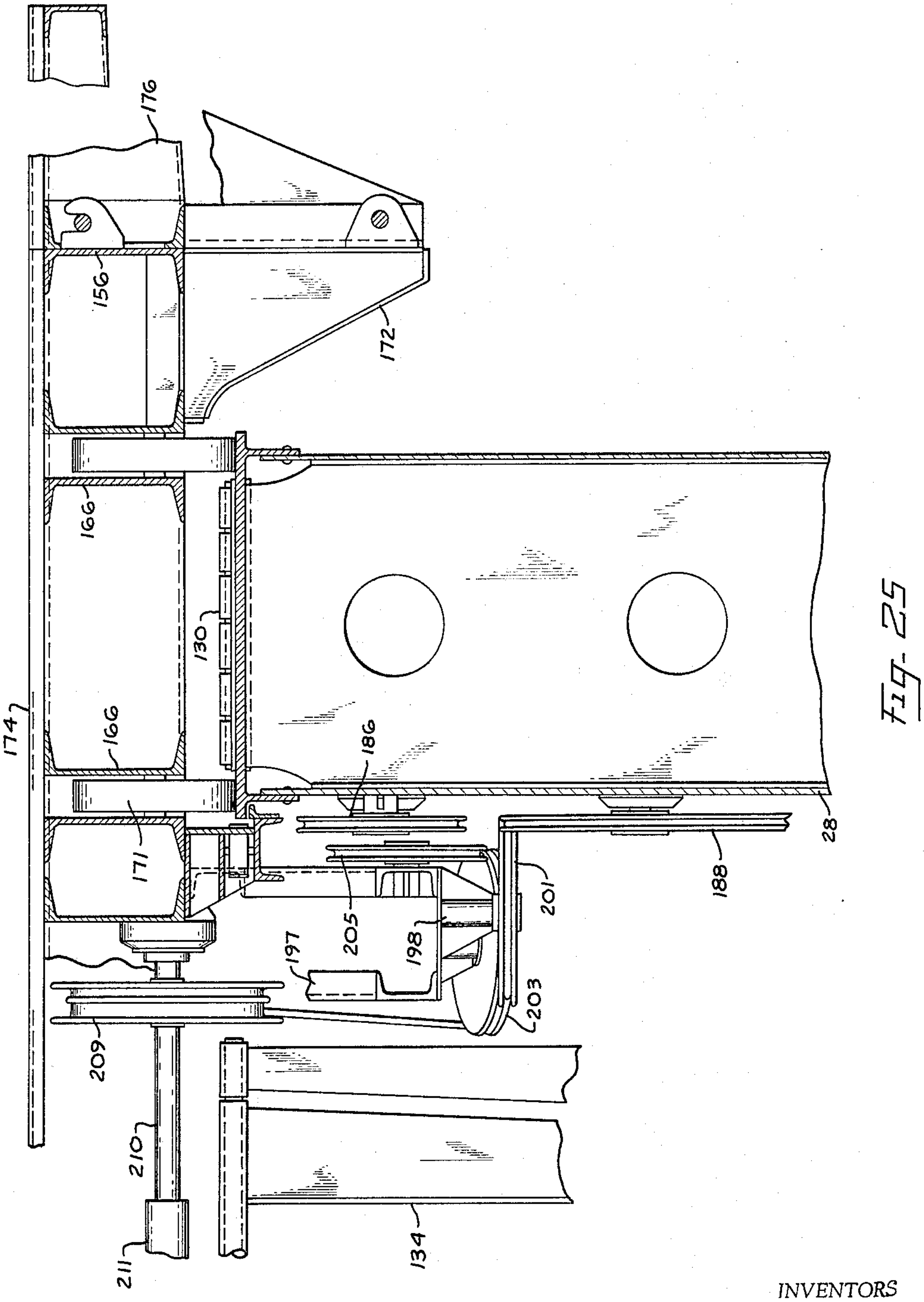
FIG. 25 is a fragmentary cross sectional view on an enlarged scale substantially on a plane indicated by the line 25—25 on FIG. 3.

In order to move cargo loads from the ship's hatch to the outer end of the extended cargo wing, the cargo dolly D is run back and forth along the top surface of the girder structure of the wing. The dolly is illustrated in FIGS. 4, 24 and 25 and comprises a rectangular frame, FIG. 24, having side members 155 and 156, end members 157 and 158, an intermediate member 159 extending from one end member to the other midway between the side members and transverse members 160, 161 and 162 extending between the side members substantially parallel to the end members.

Four wheel carrying structures 163, 164, 167 and 168 are mounted between transverse members 160 and 162, two near the side member 155 and two near the side member 156. Each wheel carrying structure carries six rollers, as indicated at 171, and these rollers ride on the top surfaces of the girder beams to support the dolly as it moves back and forth along the girder structure. Brackets, as indicated at 172, extend downwardly from both sides of the dolly frame and an operator's cat walk 173 is releasably secured on the brackets at either side of the dolly. The top surface of the dolly frame is covered by a grid 174 providing a deck for supporting cargo packages. These packages are provided with slings or harnesses engageable with helicopter cargo hooks so that the packages can be picked up by helicopters from the dolly at the outer end of the wing. The cat walk has a grid deck 175 below the dolly deck to support an operator who engages the helicopter cargo hooks with the slings or harnesses of the cargo packages. An extension 176 can be detachably supported on the brackets at the side of the dolly opposite the cat walk to increase the area of the dolly, if desired.

The dolly is operated by the hydraulic-electric power plant or power winch 125 through a cable system diagrammatically shown in FIG. 26. The power winch 125 has four cable drums 180, 181, 182 and 183 with the drums 180 and 181 at one side and the drums 182 and 183 at the opposite sides of the winch housing. The drums 181 and 183 are power drums interconnected by an axle 184 to which power is applied and the drums 180 and 182 are idler drums for holding the cable wraps about the power drums.

While the hydraulic-electric power plant has not been illustrated in detail, it includes an electric motor of sufficient horsepower energized from the ship's electric system, a hydraulic pump driven by the motor, a hydraulic motor driven by the pump and drivingly connected to the power drive axle 184, and suitable manual and automatic controls to be later described.

A pair of terminal cable sheaves 185 and 186 are rotatably mounted on the inboard end of the girder structure at the inner sides of the girder beams 25 and 26 and a pair of guide sheaves 187 and 188 are mounted on the corresponding girder beams forwardly of and below the sheaves 185 and 186 respectively. A second pair of terminal sheaves 189 and 190 are rotatably mounted on the inner sides of the girder beams 27 and 28 at the outboard or distal end of the outboard girder section and a pair of guide sheaves 191 and 192 are mounted on the inner sides of the girder beams at the inner or proximal end of the outboard section. A similar pair of sheaves 193 and 194 is mounted one on each inner side of the inboard beams at the outer end of the inboard section of the girder structure, and a pair of small guide sheaves is mounted on the inboard section, one above each of the sheaves 193 and 194 for use in folding the girder structure as will be later explained.

Guide sheaves are mounted on the underside of the dolly by means of supporting structures 197 and 198, FIG. 25 carried by the dolly frame. Each supporting structure carries one guide sheave, as indicated at 200 and 201, having substantially vertical rotational axes, one guide sheave, as indicated at 202 and 203, having inclined rotational axes and two guide sheaves having horizontal rotational axes and disposed one above the other, these four guide sheaves being indicated at 204, 205, 206 and 207. The dolly also carries near its rearward or inboard end a pair of cable drums 208 and 209 mounted on a common axle 210 which can be turned and held in selected rotational position by a manually operated pawl and ratchet device 211.

A continuous cable is trained around the several sheaves and drums and is arranged in two side by side runs with upper and lower courses in each run. As shown in FIG. 26, one end of the cable is wound on the dolly carried drum 209 and the cable then runs past the inner side of sheave 203, the outer side of sheave 201 and over the terminal sheave 190 providing the upper course 215 of the left hand cable run. From sheave 190 the cable passes under the sheaves 192 and 194 and around the two left hand winch drums 182 and 183 and from the winch drums under guide sheave 188 and around the inboard terminal sheave 186 thus providing the lower course 216 of the left hand cable run. From sheave 186 the cable runs forwardly under dolly carried sheave 205 and upwardly over sheave 207 the rotational axis of which is at right angles to the rotational axis of sheave 205. From sheave 207 the cable runs transversely of the dolly over sheave 206 and then downwardly and under sheave 204 from which it runs to and over the inboard terminal sheave 185. From sheave 185 the cable runs forwardly or outboard under guide sheave 187 from where it runs around the right hand winch drums 180 and 181. From the winch drums the cable runs under the guide sheaves 191 and 193 and to and around the outboard terminal sheave 189 thus providing the lower course 217 of the right hand cable run. From sheave 189 the cable runs outside and inside of the two dolly carried sheaves 200 and 202 and thence around the dolly carried drum 208 thus constituting the upper course 218 of the right hand cable run.

From this description it will be seen that since both ends of the cable are connected to the dolly and intermediate portions are trained around the winch drums, operation of the winch will move the dolly along the girder structure. Since the power winch is fully reversible the dolly can be run back and forth between the inboard and outboard ends of the girder structure.

When the girder structure is folded the sheaves 191 and 192 move away from the corresponding sheaves 193 and 194 to the relative position shown in broken lines in FIG. 26. This requires a lengthening of the cable which is accomplished by operation of the pawl and ratchet device 211. Conversely, when the girder structure is unfolded the cable is shortened by operation of the device 211.

Figure 30:
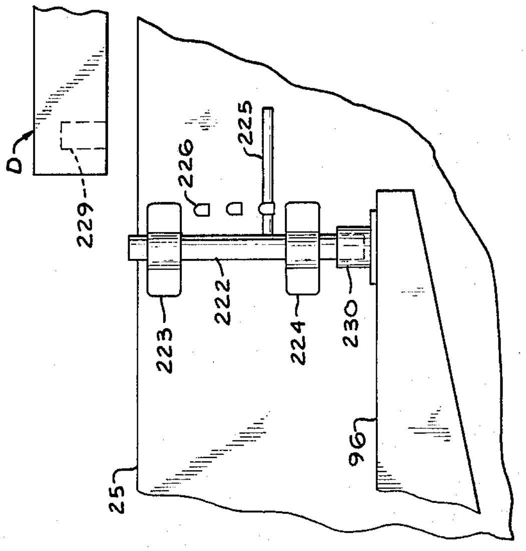

Means are shown in FIG. 30 for selectively controlling relative movement between the turntable, the girder structure and the dolly. This means is illustrated as a cylindrical or tubular bar 222 disposed in vertical position against the outer side of the girder 25 and slidably and rotatably received in vertically spaced apart bearing blocks 223 and 224 secured to the side wall of the girder. A handle 225 projects perpendicularly from the bar between the bearing blocks and three vertically spaced apart hooks 226, 227 and 228 on the side of the girder selectively receive the handle to hold the bar in any selected one of three locking positions.

When the handle 225 is in the middle hook 227, the top end of bar 222 is engaged in a downwardly opening socket 229 in the bottom surface of the dolly D and the bottom end of the bar is engaged in an upwardly opening socket 230 on the leg 96 of the tie down frame 95. In this position of the locking bar and girder structure, dolly tie down assembly and turntable are all locked together. This is the condition for storage of the wing on the ship's deck. When handle 225 is in the top hook 226 the top end of bar 222 is still engaged in socket 229 but the bottom end is free of socket 230. This locks the dolly to the girder structure so that the girder structure can be moved longitudinally on the turntable for tie down and storage purposes as explained above. When the handle 225 is in the bottom hook 228, as illustrated, the bottom end of bar 222 is engaged in socket 230 locking the girder structure to the turntable through the tie down assembly while the top end of the bar is clear of the socket 229 thereby freeing the dolly for movement along the wing. This corresponds to the operating condition of the wing.

Figure 28:
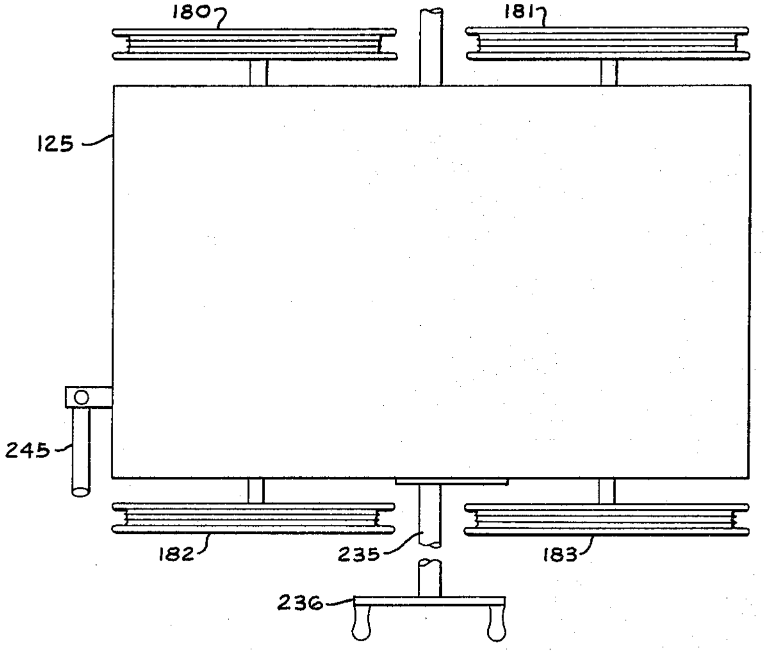
FIG. 28 is a diagrammatic top plan view of a hydraulic-electric power unit used to fold and unfold the wing and drive the dolly.
Figure 29:
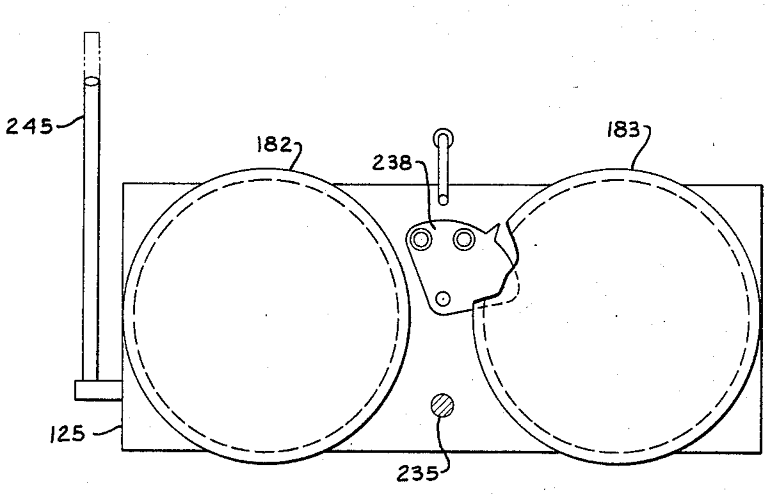
FIG. 29 is a side elevational view of the power unit diagramatically illustrated in FIG. 28; and, FIG. 30 is a fragmentary side elevational view of the wing assembly showing a locking device for locking the girder structure to the turntable, or, alternatively, locking the dolly to the girder structure.

A manual control for the hydraulic-electric power plant is shown in FIGS. 28 and 29. A shaft 235 projects from one side of the housing of the power winch 125 and carries on its outer end a double handle crank 236 by means of which the shaft can be rotated in either direction through part of a rotation. Inside the housing the shaft is connected to a control valve not illustrated and if desired, a suitable dial may be secured to the housing adjacent the shaft and a pointer mounted on the shaft to indicate the direction and extent of turning movements of the shaft. A by-pass valve, also not illustrated, is mounted in the winch housing and this valve is controlled by a valve operating handle or lever 238. The lever 238 has two operative positions in one of which the outlet of the hydraulic pump is connected to the folding and unfolding cylinders 135 and 145 through the valve controlled by handle 236 and in the other of which the pump outlet is connected through the manually controlled valve with the hydraulic motor driving the drums 181 and 183.

Figure 27:
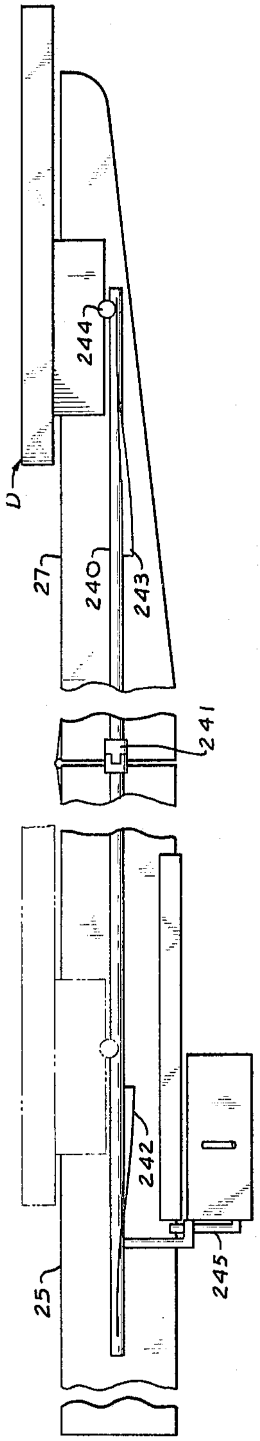
FIG. 27 is a diagrammatic side elevational view of the girder structure showing the mechanism for controlling movement of the dolly at the opposite ends of its path of travel.

The loaded dolly when moving along the track way provided by the top surface of the girder structure has a large inertia factor so that it is somewhat difficult to stop. While, in operation up to the present, the dolly has been stopped and reversed at both ends of the wing by the person operating the valve control handle 236, a faster, smoother and safer operation can be attained by utilizing an automatic decelerating and stopping device. Such a device is illustrated in FIG. 27 and comprises an elongated shaft 240 rotatably supported by the girder structure and extending the length thereof. The shaft is jointed, as indicated at 241, to provide for the folding and unfolding of the girder structure, and carries on each end portion an elongated, helical cam, as indicated at 242 and 243. The dolly carries a roller 244, or other suitable device, which engages the cam 242 or 243 and turns the shaft 240 as the dolly approaches the corresponding end of the girder structure. Shaft 240 is operatively connected by means including a lever 245 with the valve controlled by the valve operating shaft 235 so that turning movement of the shaft operates the control valve, slowly closing the valve until the valve is completely closed and the dolly is stopped as it reaches the end of its travel. In order to start the dolly in the opposite direction the valve is manually reversed by the handle 236. As the dolly moves in the reverse direction the shaft 240 is turned back to its normal or neutral position and when roller 244 engages the cam at the opposite end of the shaft, the shaft is again turned to operate the control valve in the manner described above.

While a particular embodiment of the invention has been hereinabove described and illustrated in the accompanying drawings for the purpose of disclosing the invention, it is to be understood that the scope of the invention is not limited to the embodiment so illustrated and described but is commensurate with the scope of the appended claims.

I claim:

1. A wing structure mountable on a cargo ship to project laterally therefrom for moving cargo from the ship's hold to a location spaced from the ship to permit safe cargo pick up by helicopters comprising a mounting structure adapted to be detachably mounted on a ship's deck and including a turntable whereby the wing can be moved between a stored position in which it extends along the deck of the associated ship and an operative position in which it projects laterally from the side of the ship, a cantilever beam structure mounted on said mounting structure, a load carrying dolly mounted on said beam structure for movement back and forth between the ends of said beam structure when said beam structure is in its laterally projecting position, and power means carried by one of said structures and operatively connected to said dolly to move said dolly back and forth along said beam structure.

2. A wing structure mountable on a ship to project laterally from the ship to provide a location spaced from the ship for safe operation of helicopters in picking up or setting down cargo loads or personnel comprising a mounting structure adapted to be secured to a ship's deck adjacent a cargo hold and including a turntable to enable movement of the wing structure through an angle of approximately 90° between a stored position in which the wing structure extends along the ship's deck and an operative position in which the wing structure projects laterally from one side of the ship, a cantilever beam structure mounted on said support structure and including separate longitudinal portions foldable one upon the other to reduce the length of the wing structure when moved to said stored position, a load carrying dolly mounted on said beam structure for movement back and forth between the ends of said beam structure, and power means operatively connected to said dolly for moving the dolly back and forth along said beam structure.

3. A wing structure mountable on a ship to project laterally from the ship to provide a location spaced from the ship for safe operation of aircraft in picking up or setting down cargo loads comprising a mounting structure adapted to be secured on the ship's deck adjacent a cargo hold and including a fixed base and a turntable rotatably mounted on said base, a beam structure including an inner part slidably mounted on said turntable for initial position adjustment and an outer part hinged to the outer end of said inner part, each of said parts comprising a pair of hollow beams secured in spaced apart and parallel relationship to each other and having sufficient buoyancy to float said wing structure in water, means connected between said base and said turntable effective to move said beam structure between a stored position in which it extends along the deck of an associated ship and an operative position in which it projects laterally from one side of the ship, folding means connected between the two parts of said beam structure and effective to fold said outer part onto said inner part when said beam structure is moved to its stored position and to unfold said outer part when said beam structure is moved to its operative position, a load carrying dolly movable on the top surface of said beam structure, and power means carried by said beam structure and connected to said folding means and said dolly for alternatively folding and unfolding said beam structure and moving said dolly back and forth along said beam structure.

4. A ship's wing for facilitating the operation of rotary wing aircraft in unloading or loading a cargo ship comprising a mounting structure including a base adapted to be secured to a ship's deck adjacent a cargo hold of the ship, and a turntable rotatably mounted on said base, a beam structure comprising an inner part slidably mounted near one end on said turntable and an outer part hinged at one end to the outer end of said inner part, adjustable tie down means connected to said one end of said inner part for attachment to the ship's hatch frame to support said beam structure in cantilever condition, a load carrying dolly movable back and forth along the top of said beam structure, a power winch carried by said beam structure, and cable means connected between said power winch and said dolly for moving said dolly.

5. A wing structure adapted to be mounted on the deck of a cargo ship adjacent a hold of the ship to extend from the hold outwardly of the ship to an outboard location at which rotary wing aircraft may operate safely to remove cargo packages, said wing comprising a fixed frame work adapted to be secured to the ship's deck and including a circular track, a turntable having rollers running on said circular track and supporting a rectangular turntable frame, a beam structure mounted on said turntable frame and comprising a pair of hollow girders secured in spaced apart and parallel relationship to each other, roller means carried by said turntable frame and engaging said girders to provide limited longitudinal movement of said beam structure relative to said turntable frame, a car movable along the top surfaces of said girders between the opposite ends of said beam structure, and car moving power means carried by said beam structure and operatively connected to said car.

6. A wing structure adapted to be mounted on the deck of a ship and extend from a hold laterally of the ship to a location at which rotary wing aircraft can safely pick up or deliver cargo comprising a support structure mounted on the ship's deck and including a base frame and a turntable, an elongated beam structure mounted on said turntable and including an inner and an outer section and hinge means interconnecting said sections so that said outer section can be folded over onto said inner section, folding means carried by said sections and effective to fold and unfold said outer section relative to said inner section, a load carrying car movable along said beam structure when said sections are unfolded, power means connected to said folding means and said car, and control means effective to maintain said car in a predetermined inward position when said beam structure sections are being folded or unfolded and to move said car back and forth along said beam structure only when said sections are unfolded.

7. A wing structure mountable on a cargo ship adjacent a cargo hold and adapted to project laterally of the ship to a location at which rotary wing aircraft can safely pick up or deliver cargo comprising a support structure adapted to be secured to a ship's deck between the gunwale and a hatch combing of the ship, an elongated beam structure mounted on said support structure and adapted to extend at its inner end over the adjacent hatch opening of the ship, means depending from said beam structure for tying down the inner end of said beam structure to the ship framing around the hatch opening, said beam structure comprising an inner section and an outer section and hinge means interconnecting said sections for folding of said outer section back onto said inner section, a load carrying car movable along said beam structure substantially from one end to the other when said beam structure is unfolded, car moving means comprising a power winch carried by said beam structure and having cable sheaves, cable sheaves mounted on said beam structure adjacent the opposite ends and the hinge joint of said beam structure, a cable trained over said sheaves and connected to said car, and a cable winding mechanism carried by said car and receiving portions of said cable for paying out and winding in the cable as said beam structure is folded and unfolded.

8. A wing structure mountable on a cargo ship's deck adjacent a cargo hatch and adapted to project laterally of the ship to a location at which rotary wing aircraft can safely pick up and deliver cargo comprising a support structure including a base frame mounted on and secured to the deck of the ship, a turntable rotatably mounted on said base frame and carrying a turntable frame, an elongated beam structure carried by said turntable frame, a load carrying car carried by said beam structure for movement back and forth along said beam structure between the opposite ends thereof, a power operated winch carried by said beam structure, cable means connected between said winch and said car for moving said car along said beam structure, rollers carried by said turntable frame and engaging the bottom surface of said beam structure, an auxiliary frame secured to and extending along said turntable frame, rollers carried by said auxiliary frame and engaging the top surface of said beam structure, said rollers supporting said beam structure in cantilever condition for longitudinal movement to various positions of adjustment relative to said turntable frame, and tie-down means secured to and depending from one end of said auxiliary frame for connection to the hatch frame of the ship to tie-down the inner end of the cantilever beam structure.

9. A wing structure mountable on a cargo ship's deck adjacent a cargo hatch and adapted to project laterally of the ship to a location at which rotary wing aircraft can safely pick-up and deliver cargo comprising a support structure including a base frame mounted on the deck between the cargo hatch and the gunwale, a turntable rotatably mounted on the base frame for swinging movements of the wing between a stored position and an operative position, a turntable frame carried by said turntable, an elongated beam structure mounted at one end on said turntable frame, a load carrying car movable in both directions along said beam structure between the opposite ends thereof, a power winch carried by said beam structure, cable means connecting said power winch to said car for moving said car along said beam structure, and locking means carried by said beam structure and having different operative positions in one of which it locks said beam structure, said turntable frame and said car together against relative movement, in another of which it locks said beam structure and said car together while leaving said beam structure free to move relative to said turntable frame, and in another of which it locks said beam structure and said turntable frame together while leaving said car free to move relative to said beam structure.

10. A wing structure mountable on a cargo ship to extend laterally of the ship to a location at which rotary wing aircraft can safely pick-up and deliver cargo comprising a support structure mountable on a ship's deck between the ship's gunwale and a cargo hatch and including a base frame secured to the deck, a turntable mounted on the base frame, an elongated beam structure carried by the turntable for swinging movements between a stored position and an operative or outboard position, means for connecting said beam structure to the ship's frame to support the beam structure in cantilever condition, a load carrying car movable in opposite directions along said beam structure substantially from one end to the other end thereof, a power winch carried by said beam structure, cable means connected between said power winch and said car for moving said car along said beam structure, and control means effective to automatically slow down and stop said car at both ends of its path of travel along said beam structure and including cam devices carried by said beam structure near the opposite ends thereof, shaft means interconnecting said cam devices, means operatively connecting said shaft means to said power winch, and control means carried by said car and engageable with said cam devices to turn said shaft means and operate said control means.

11. A wing structure mountable on a cargo ship to extend laterally of the ship to a location at which cargo can be safely delivered and picked up by rotary wing aircraft comprising a support structure mountable on a ship's deck between the ship's gunwale and a cargo hatch, an elongated beam structure carried by said support structure to extend from the adjacent cargo hatch outwardly of the corresponding side of the ship, a load carrying a car mounted on and movable along said beam structure, power means effective under manual control to move said car in either selected direction between the opposite ends of said beam structure, brackets secured to the opposite sides of said car, an operator's platform detachably mounted on the brackets at a selected side of said car and having a deck surface below the deck surface of said car, and a car extension detachably mounted on the brackets at the other side of said car and having a deck surface substantially level with the deck surface of said car.

References Cited by the Examiner

UNITED STATES PATENTS

| | | | |
|---|---|---|---|
| 1,292,097 | 1/1919 | Schweinert | 114—43.5 |
| 2,183,409 | 12/1939 | Schiebeler | 212—132 X |
| 3,042,227 | 7/1962 | Tantlinger | 214—15 |

GERALD M. FORLENZA, *Primary Examiner.*

ROBERT G. SHERIDAN, *Examiner.*